(12) United States Patent
Zhang et al.

(10) Patent No.: US 11,716,691 B2
(45) Date of Patent: Aug. 1, 2023

(54) SIGNAL TRANSMISSION METHOD, RELATED DEVICE, AND SYSTEM

(71) Applicant: HUAWEI TECHNOLOGIES CO., LTD., Guangdong (CN)

(72) Inventors: Di Zhang, Beijing (CN); Xianda Liu, Beijing (CN); Jianqin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/213,473

(22) Filed: Mar. 26, 2021

(65) Prior Publication Data

US 2021/0235386 A1 Jul. 29, 2021

Related U.S. Application Data

(63) Continuation of application No. PCT/CN2019/108759, filed on Sep. 27, 2019.

(30) Foreign Application Priority Data

Sep. 28, 2018 (CN) .......................... 201811146929.X

(51) Int. Cl.
 *H04W 52/14* (2009.01)
 *H04L 5/00* (2006.01)
 (Continued)

(52) U.S. Cl.
 CPC ......... *H04W 52/146* (2013.01); *H04L 5/0048* (2013.01); *H04W 72/0473* (2013.01); *H04W 52/242* (2013.01)

(58) Field of Classification Search
 CPC ... H04B 7/0691; H04L 5/0048; H04L 5/0023; H04L 5/0051; H04L 5/0091; H04W 52/146; H04W 72/0473; H04W 52/242
 (Continued)

(56) References Cited

U.S. PATENT DOCUMENTS

2013/0195025 A1 8/2013 Chatterjee et al.
2017/0034785 A1* 2/2017 Suzuki .................. H04W 52/08
(Continued)

FOREIGN PATENT DOCUMENTS

CN 108024322 A 5/2018
CN 108111253 A 6/2018
(Continued)

OTHER PUBLICATIONS

CMCC: "Discussion on NR power control and sharing", SGPP Draft; R1-1713852, 3rd Generation Partnership Project (S3GPP), vol. RAN WG1, no. Prague, P.R. Czechia; Aug. 21, 2017-20770825 (Aug. 20, 2017), XP051316646 (Year: 2017).*
(Continued)

*Primary Examiner* — John J Lee

(57) ABSTRACT

A signal transmission method, a related device, and a system are provided. The method includes a terminal receiving configuration information, where the configuration information indicates N sets of power control parameters configured for M uplink resources or uplink resource sets, where M≥1, M is a positive integer, N>1, and N is a positive integer; and the terminal transmits an uplink signal on the M uplink resources or uplink resource sets, where transmission power for transmitting the uplink signal on the M uplink resources or uplink resource sets is determined based on a first power control parameter, and the first power control parameter is selected from the N sets of power control parameters. According to the foregoing solution, uplink transmission power can be more flexibly adjusted, and power efficiency in uplink transmission and uplink transmission performance can be maximized.

20 Claims, 12 Drawing Sheets

(51) Int. Cl.
*H04W 72/044* (2023.01)
*H04W 52/24* (2009.01)

(58) Field of Classification Search
USPC .............................. 455/522, 69, 452.1, 509
See application file for complete search history.

(56) References Cited

U.S. PATENT DOCUMENTS

| | | | |
|---|---|---|---|
| 2019/0223108 A1* | 7/2019 | Wang | H04W 52/146 |
| 2020/0336990 A1* | 10/2020 | Chen | H04W 72/042 |
| 2020/0374903 A1* | 11/2020 | Wang | H04W 72/0446 |

FOREIGN PATENT DOCUMENTS

| | | |
|---|---|---|
| CN | 108112065 A | 6/2018 |
| CN | 108271175 A | 7/2018 |
| WO | 2017067138 A1 | 4/2017 |

OTHER PUBLICATIONS

CMCC: "Discussion on NR power control and sharing", 3GPP Draft; R1-1713852, Aug. 20, 2017, XP051316646, total 4 pages.

ITL: "UL power control and PHR", 3GPP Draft; R1-1718625, Oct. 8, 2017, XP051341799, total 5 pages.

Huawei et al: "Detailed considerations on UL power control design for NR", 3GPP Draft; R1-1706930, May 8, 2017, XP051263392, total 5 pages.

Extended European Search Report for Application No. EP19868017.5 dated Oct. 29, 2021, 13 pages.

CMCC, Discussion on power control framework. 3GPP TSG RAN WG1 Meeting 90bis Prague, CZ, Oct. 9-13, 2017, R1-1717892, 5 pages.

3GPP TS 38.331 V15.3.0 (Sep. 2018), 3rd Generation Partnership Project; Technical Specification Group Radio Access Network; NR; Radio Resource Control (RRC) protocol specification(Release 15), 445 pages.

Nokia, Alcatel-Lucent Shanghai Bell, UL Power Control for MIMO. 3GPP TSG RAN WG1 NR Ad-Hoc#2, Qingdao, P.R. China Jun. 27-30, 2017, R1-1711397, 6 pages.

Huawei, HiSilicon, Discussion on panel-based UL beam selection. 3GPP TSG RAN WG1 Meeting #94, Gothenburg, Sweden, Aug. 20-24, 2018, R1-1809122, 7 pages.

Guangdong OPPO Mobile Telecom, Uplink power control for NR. 3GPP TSG RAN WG1 Meeting #88, Athens, Greece, Feb. 13-17, 2017, R1-1701947, 2 pages.

International Search Report and Written Opinion issued in PCT/CN2019/108759 dated Dec. 27, 2019, 9 pages.

Office Action issued in CN 201811146929.X dated Oct. 9, 2020, 13 pages.

* cited by examiner

```
SRS-ResourceSet ::=                              SEQUENCE {
    srs-ResourceSetId                            SRS-ResourceSetId,
    srs-ResourceIdList                           SEQUENCE (SIZE(1..maxNrofSRS-
ResourcesPerSet)) OF SRS-ResourceId                                         OPTIONAL, -
- Cond Setup resourceType                                 CHOICE {
        aperiodic                                SEQUENCE {
            aperiodicSRS-ResourceTrigger         INTEGER (1..maxNrofSRS-TriggerStates-
1),
            csi-RS                               NZP-CSI-RS-ResourceId         OPTIONAL,
-- Cond NonCodebook
            slotOffset                           INTEGER (1..32)               OPTIONAL,
-- Need S
            ...
        },
        semi-persistent                          SEQUENCE {
            associatedCSI-RS                     NZP-CSI-RS-ResourceId         OPTIONAL,
-- Cond NonCodebook
            ...
        },
        periodic                                 SEQUENCE {
            associatedCSI-RS                     NZP-CSI-RS-ResourceId         OPTIONAL,
-- Cond NonCodebook
            ...
        }
    },
    usage                                        ENUMERATED {beamManagement, codebook,
nonCodebook, antennaSwitching},
    alpha                                        Alpha                         OPTIONAL, -- Need S
    p0                                           INTEGER (-202..24)            OPTIONAL, --
Cond Setup
    pathlossReferenceRS                          CHOICE {
        ssb-Index                                SSB-Index,
        csi-RS-Index                             NZP-CSI-RS-ResourceId
    }                                                                          OPTIONAL, -- Need S
    srs-PowerControlAdjustmentStates             ENUMERATED { sameAsFci2,
separateClosedLoop}                              OPTIONAL, -- Need S
    ...
}
```

FIG. 2

```
PUSCH-PowerControl ::=              SEQUENCE {
    tpc-Accumulation                    ENUMERATED { disabled }              OPTIONAL,
- Need S
    msg3-Alpha                          Alpha                                OPTIONAL,
- Need S
    p0-NominalWithoutGrant              INTEGER (-202..24)                   OPTIONAL,
- Need R,
    p0-AlphaSets                        SEQUENCE (SIZE (1..maxNrofP0-PUSCH-AlphaSets)) OF
P0-PUSCH-AlphaSet                                                            OPTIONAL,
- Need R,
    pathlossReferenceRSToAddModList     SEQUENCE (SIZE (1..maxNrofPUSCH-
PathlossReferenceRSs)) OF PUSCH-PathlossReferenceRS                          OPTIONAL,
- Need N
    pathlossReferenceRSToReleaseList    SEQUENCE (SIZE (1..maxNrofPUSCH-
PathlossReferenceRSs)) OF PUSCH-PathlossReferenceRS-Id                       OPTIONAL,
- Need N
    twoPUSCH-PC-AdjustmentStates        ENUMERATED {twoStates}               OPTIONAL,
Need S
    deltaMCS                            ENUMERATED {enabled}                 OPTIONAL,
Need S
    sri-PUSCH-MappingToAddModList       SEQUENCE (SIZE (1..maxNrofSRI-PUSCH-Mappings)) OF
SRI-PUSCH-PowerControl                                                       OPTIONAL,
Need N
    sri-PUSCH-MappingToReleaseList      SEQUENCE (SIZE (1..maxNrofSRI-PUSCH-Mappings)) OF
SRI-PUSCH-PowerControlId                                                     OPTIONAL
Need N
}

P0-PUSCH-AlphaSet ::=               SEQUENCE {
    p0-PUSCH-AlphaSetId                 P0-PUSCH-AlphaSetId,
    p0                                  INTEGER (-16..15)
    alpha                               Alpha                                OPTIONAL
- Need S
}

P0-PUSCH-AlphaSetId ::=             INTEGER (0..maxNrofP0-PUSCH-AlphaSets-1)

PUSCH-PathlossReferenceRS ::=       SEQUENCE {
    pusch-PathlossReferenceRS-Id        PUSCH-PathlossReferenceRS-Id,
    referenceSignal                     CHOICE {
        ssb-Index                           SSB-Index,
        csi-RS-Index                        NZP-CSI-RS-ResourceId
    }
}

PUSCH-PathlossReferenceRS-Id ::=    INTEGER (0..maxNrofPUSCH-PathlossReferenceRSs-1)

SRI-PUSCH-PowerControl ::=          SEQUENCE {
    sri-PUSCH-PowerControlId            SRI-PUSCH-PowerControlId,
    sri-PUSCH-PathlossReferenceRS-Id    PUSCH-PathlossReferenceRS-Id,
    sri-P0-PUSCH-AlphaSetId             P0-PUSCH-AlphaSetId,
    sri-PUSCH-ClosedLoopIndex           ENUMERATED { i0, i1 }
}

SRI-PUSCH-PowerControlId ::=        INTEGER (0..maxNrofSRI-PUSCH-Mappings-1)

BetaOffsets ::=                     SEQUENCE {
    betaOffsetACK-Index1                INTEGER(0..31)                       OPTIONAL, -- Need S
    betaOffsetACK-Index2                INTEGER(0..31)                       OPTIONAL, -- Need S
    betaOffsetACK-Index3                INTEGER(0..31)                       OPTIONAL, -- Need S
    betaOffsetCSI-Part1-Index1          INTEGER(0..31)                       OPTIONAL, -- Need S
    betaOffsetCSI-Part1-Index2          INTEGER(0..31)                       OPTIONAL, -- Need S
    betaOffsetCSI-Part2-Index1          INTEGER(0..31)                       OPTIONAL, -- Need S
    betaOffsetCSI-Part2-Index2          INTEGER(0..31)                       OPTIONAL  -- Need S
}
```

FIG. 3

```
PUCCH-Config ::=                        SEQUENCE {
    resourceSetToAddModList             SEQUENCE (SIZE (1..maxNrofPUCCH-
ResourceSets)) OF PUCCH-ResourceSet                 OPTIONAL,   -- Need N
    resourceSetToReleaseList            SEQUENCE (SIZE (1..maxNrofPUCCH-
ResourceSets)) OF PUCCH-ResourceSetId               OPTIONAL,   -- Need N resourceToAddModList                SEQUENCE (SIZE (1..maxNrofPUCCH-Resources))
OF PUCCH-Resource                       OPTIONAL,   -- Need N
    resourceToReleaseList               SEQUENCE (SIZE (1..maxNrofPUCCH-Resources))
OF PUCCH-ResourceId                     OPTIONAL,   -- Need N format1                             SetupRelease { PUCCH-FormatConfig
}                                                   OPTIONAL,   -- Need M
    format2                             SetupRelease { PUCCH-FormatConfig
}                                                   OPTIONAL,   -- Need M
    format3                             SetupRelease { PUCCH-FormatConfig
}                                                   OPTIONAL,   -- Need M
    format4                             SetupRelease { PUCCH-FormatConfig
}                                                   OPTIONAL,   -- Need M schedulingRequestResourceToAddModList   SEQUENCE (SIZE (1..maxNrofSR-Resources)) OF
SchedulingRequestResourceConfig         OPTIONAL,   -- Need N
    schedulingRequestResourceToReleaseList  SEQUENCE (SIZE (1..maxNrofSR-Resources)) OF
SchedulingRequestResourceId             OPTIONAL,   -- Need N multi-CSI-PUCCH-ResourceList        SEQUENCE (SIZE (1..2)) OF PUCCH-
ResourceId                                          OPTIONAL,   -- Need M
    dl-DataToUL-ACK                     SEQUENCE (SIZE (1..8)) OF INTEGER
(0..15)                                             OPTIONAL,   -- Need M spatialRelationInfoToAddModList     SEQUENCE (SIZE
(1..maxNrofSpatialRelationInfos)) OF PUCCH-SpatialRelationInfo     OPTIONAL,   -- Need N
    spatialRelationInfoToReleaseList    SEQUENCE (SIZE
(1..maxNrofSpatialRelationInfos)) OF PUCCH-SpatialRelationInfoId   OPTIONAL,   -- Need N pucch-PowerControl                  PUCCH-PowerControl          OPTIONAL,   -- Need M
    ...
}
```

FIG. 4A

```
PUCCH-PowerControl ::=                  SEQUENCE {
    deltaF-PUCCH-f0                     INTEGER (-16..15)                   OPTIONAL,
    deltaF-PUCCH-f1                     INTEGER (-16..15)                   OPTIONAL,
    deltaF-PUCCH-f2                     INTEGER (-16..15)                   OPTIONAL,
    deltaF-PUCCH-f3                     INTEGER (-16..15)                   OPTIONAL,
    deltaF-PUCCH-f4                     INTEGER (-16..15)                   OPTIONAL,
    p0-Set                              SEQUENCE (SIZE (1..maxNrofPUCCH-P0-PerSet)) OF
P0-PUCCH                                OPTIONAL,
    pathlossReferenceRSs                SEQUENCE (SIZE (1..maxNrofPUCCH-
PathlossReferenceRSs)) OF PUCCH-PathlossReferenceRS                         OPTIONAL,
    twoPUCCH-PC-AdjustmentStates        ENUMERATED {twoStates}              OPTIONAL,
    ...
}

P0-PUCCH ::=                            SEQUENCE {
    p0-PUCCH-Id                         P0-PUCCH-Id,
    p0-PUCCH-Value                      INTEGER (-16..15)
}

P0-PUCCH-Id ::=                         INTEGER (1..8)

PUCCH-PathlossReferenceRS ::=           SEQUENCE {
    pucch-PathlossReferenceRS-Id        PUCCH-PathlossReferenceRS-Id,
    referenceSignal                     CHOICE {
        ssb-Index                           SSB-Index,
        csi-RS-Index                        NZP-CSI-RS-ResourceId
    }
}
```

FIG. 4B

SIGNAL TRANSMISSION METHOD, RELATED DEVICE, AND SYSTEM

CROSS-REFERENCE TO RELATED APPLICATIONS

This application is a continuation of International Application No. PCT/CN2019/108759, filed on Sep. 27, 2019, which claims priority to Chinese Patent Application No. 201811146929.X, filed on Sep. 28, 2018. The disclosures of the aforementioned applications are hereby incorporated by reference in their entireties.

TECHNICAL FIELD

This application relates to the field of wireless communications technologies and, in particular, to a signal transmission method, a related device, and a system.

BACKGROUND

As one of key technologies in new radio access technologies (NR), a high frequency (HF) may provide more spectrum resources, support more antennas, and improve a system capacity, and therefore, has been widely studied. As a frequency increases, a wavelength of a radio signal correspondingly decreases. A small wavelength may help greatly reduce sizes of antennas at a receiving end and a transmitting end. Therefore, a plurality of antennas can be easily integrated into a panel with limited space. According to a multi-antenna beamforming technology, energy is converged in a specific direction to send signals, so that coverage can be effectively enhanced, and then communication performance can be improved. Correspondingly, a receiver can form a directional receive beam to receive, with a high gain, a radio signal arriving in a spatial direction. With continuous evolution of antenna packing technologies, a plurality of antenna elements may be more easily nested and combined with a chip to form an antenna panel or an antenna array. This makes it possible to configure a plurality of low-correlation antenna panels (or antenna arrays) on a transmitter. The plurality of antenna panels can independently form transmit beams, so that one transmitter can send a data stream through different beams, so as to improve a transmission capacity or transmission reliability.

Power control during uplink signal transmission is very important for an entire wireless communications system.

Uplink power control is a key to the entire wireless communications transmission system. Sufficient transmit energy per bit that is required for satisfying quality of service (QoS) needs to be reached. In addition, interference to another user in the system needs to be minimized. To achieve these objectives, uplink power control needs to adapt to characteristics of radio transmission channels.

Conventional power control methods for a user equipment (UE) end may be classified into open-loop power control and closed-loop power control. In the open-loop power control, a base station transmits a downlink reference signal by using fixed power and notifies UE of the transmission power through a SIB 2. The UE estimates a downlink path loss (PL) based on strength of a received reference signal and considers that an uplink path loss is equivalent to the downlink path loss. The base station notifies the UE of expected reception power (P0) of the base station through the SIB 2. The UE sets transmission power based on P0 and PL. In the closed-loop power control, a receiving end compares an actually received signal-to-noise ratio (SINR) with a target value to obtain a closed-loop power control command (TPC, Transmit Power Control), and feeds back the closed-loop power control command to a transmitting end through a PDCCH. When the SINR is greater than the target value, the transmitting end is instructed to decrease power. When the SINR is less than the target value, the transmitting end is instructed to increase power. Generally, when the UE is just powered on, a communication channel between the UE and a TRP is not established, and the open-loop power control is used. As the communication channel is successfully established, the closed-loop power control starts to take effect.

In the prior art, power control at a UE end is centralized on channels transmitted on a plurality of uplink carriers, and control is performed through power coordination between carriers. However, in LTE, one UE has only one antenna port/beam. In NR, one UE may have a plurality of antenna panels, which correspond to a plurality of antenna ports/beams. UE-side power control for signals transmitted by different antenna panels on a same UE is not described in content in an existing protocol.

SUMMARY

This application provides a signal transmission method, a related device, and a system, to adapt to uplink power control on a multi-panel terminal.

According to a first aspect, this application provides a signal transmission method, applied to a terminal side. The method may include: a terminal receiving configuration information, where the configuration information may indicate N sets of power control parameters configured for M uplink resources or uplink resource sets (uplink resources/resource sets), where $M \geq 1$, M is a positive integer, $N > 1$, and N is a positive integer. The terminal transmits an uplink signal on the M uplink resources or uplink resource sets, where transmission power for transmitting the uplink signal on the M uplink resources or uplink resource sets is determined based on a first power control parameter, and the first power control parameter is selected from the N sets of power control parameters.

According to a second aspect, this application provides a signal transmission method, applied to a network device side. The method may include: a network device sending configuration information to a terminal, where the configuration information may indicate N sets of power control parameters configured for M uplink resources or uplink resource sets. The network device receives, on the M uplink resources or uplink resource sets, an uplink signal sent by the terminal.

In this application, the terminal has L antenna panels, and the N sets of power control parameters are configured based on K antenna panels of the terminal, where $M \geq 1$, M is a positive integer, $N > 1$, N is a positive integer, $2 \leq K \leq L$, and both K and L are positive integers.

Optionally, each of the M uplink resources/resource sets is associated with the N sets of power control parameters. Herein, that each of the M uplink resources/resource sets is associated with the N sets of power control parameters means that a power control parameter corresponding to each of the M uplink resources/resource sets may be selected from the N sets of power control parameters. In other words, the N sets of power control parameters are candidate power control parameters of each of the M uplink resources/resource sets.

Optionally, at least one of the M uplink resources/resource sets is associated with the N sets of power control parameters. Herein, that the at least one uplink resource/resource set is associated with the N sets of power control parameters means that a power control parameter corresponding to each of the at least one uplink resource/resource set may be selected from the N sets of power control parameters. In other words, the N sets of power control parameters are candidate power control parameters of the at least one uplink resource/resource set.

Optionally, at least one of the M uplink resources/resource sets is associated with at least two of the N sets of power control parameters. Herein, that the at least one uplink resource/resource set is associated with the at least two set of power control parameters means that a power control parameter corresponding to each of the at least one uplink resource/resource set may be selected from the at least two set of power control parameters. In other words, the at least two set of power control parameters is candidate power control parameters of the at least one uplink resource/resource set.

In the solutions described in the first aspect and the second aspect, a plurality of transmission paths corresponding to a plurality of panels of the terminal are considered, and a plurality of sets of power control parameters are configured for the M uplink resources/resource sets. In this way, the terminal may flexibly determine, based on spatial relationship information or other information (for example, a panel switch indication, panel ID information, or a transmission mode), which set or sets of power control parameters are to be used, so that uplink transmission power can be more flexibly adjusted, and power efficiency in uplink transmission and uplink transmission performance can be maximized.

With reference to the first aspect or the second aspect, in some optional embodiments, the power control parameter may include one or more of the following: target reception power of the uplink signal, a path loss compensation factor, and a path loss reference signal. The target reception power P0 is lowest signal strength at which the network device can demodulate the uplink signal, or is reception power at which the network device expects to receive the uplink signal. The path loss compensation factor alpha/a is used by the network device to determine a weight of a path loss in uplink power control. The path loss reference signal (pathloss RS) means that the terminal estimates a downlink path loss (PL) based on strength of a received reference signal for estimating a path loss and considers that an uplink path loss is equivalent to the downlink path loss. Optionally, for a sounding reference signal (SRS) or a physical uplink shared channel (PUSCH), the power control parameter may include the target reception power of the uplink signal, the path loss compensation factor, and the path loss reference signal. Optionally, for a physical uplink control channel (PUCCH), the power control parameter may include the path loss reference signal and the target reception power of the uplink signal.

With reference to the first aspect or the second aspect, in some optional embodiments, the configuration information sent by the network device to the terminal may indicate a mapping between a panel and a power control parameter.

With reference to the first aspect or the second aspect, in some optional embodiments, the configuration information sent by the network device to the terminal may alternatively indicate only the N sets of power control parameters, a mapping between the N sets of power control parameters and panels may comply with a preset mapping rule, and the preset mapping rule is known to the terminal.

With reference to the first aspect or the second aspect, in some optional embodiments, for different uplink signals, configuring the N sets of power control parameters for the M uplink resources/resource sets may be specifically as follows:

1. The N sets of power control parameters are configured for one SRS resource set. In this case, M=1. Different from that in the prior art, one SRS resource set no longer corresponds to only one set of power control parameters, but corresponds to a plurality of sets of power control parameters. This constitutes no limitation. Alternatively, a plurality of SRS resource sets may be bound together, and the N sets of power control parameters are configured for the plurality of SRS resource sets. In this case, M≥1.

Configuring the N sets of power control parameters for the plurality of SRS resource sets may specifically include the following several cases:

Case 1: Optionally, a power control parameter corresponding to each of the plurality of SRS resource sets may be selected from the N sets of power control parameters.

Case 2: Optionally, a power control parameter corresponding to each of at least one of the plurality of SRS resource sets may be selected from the N sets of power control parameters.

Case 3: Optionally, a power control parameter corresponding to each of at least one of the plurality of SRS resource sets may be selected from at least two of the N sets of power control parameters.

2. The N sets of power control parameters are configured for one PUSCH resource. In this case, M=1. Different from that in the prior art, one PUSCH resource no longer corresponds to only one set of power control parameters, but corresponds to a plurality of sets of power control parameters. This constitutes no limitation. Alternatively, a plurality of PUSCH resources may be bound together, and the N sets of power control parameters are configured for the plurality of PUSCH resources. In this case, M>1.

Similarly, configuring the N sets of power control parameters for the plurality of PUSCH resources may specifically include the following several cases:

Case 1: Optionally, a power control parameter corresponding to each of the plurality of PUSCH resources may be selected from the N sets of power control parameters.

Case 2: Optionally, a power control parameter corresponding to each of at least one of the plurality of PUSCH resources may be selected from the N sets of power control parameters.

Case 3: Optionally, a power control parameter corresponding to each of at least one of the plurality of PUSCH resources may be selected from at least two of the N sets of power control parameters.

3. The N sets of power control parameters are configured for one PUCCH resource set list or resource list. One PUCCH resource set list includes M (M≥1, and M is a positive integer) PUCCH resource sets, and one PUCCH resource list includes M (M≥1, and M is a positive integer) PUCCH resources. Different from that in the prior art, one PUCCH resource set list or resource list no longer corresponds to only one set of power control parameters, but corresponds to a plurality of sets of power control parameters.

For power control of another uplink signal (for example, a physical random access channel (PRACH)), a specific implementation of configuring the N sets of power control parameters for the M uplink resources/resource sets may be similar to that in the foregoing descriptions of 1 to 3.

With reference to the first aspect or the second aspect, in some optional embodiments, the N sets of power control parameters may include a power control parameter for transmitting an uplink signal on the M uplink resources or uplink resource sets through a single antenna panel and/or a power control parameter for transmitting an uplink signal on the M uplink resources or uplink resource sets through a plurality of antenna panels.

With reference to the first aspect or the second aspect, in some optional embodiments, the N sets of power control parameters may be configured in the following manners:

Manner 1: Configure a power control parameter for each panel (per panel configuration manner).

Specifically, K+Q sets of power control parameters are configured for the M uplink resources/resource sets, that is, N=K+Q. The K sets of power control parameters are respectively configured for the K panels to separately transmit uplink signals, and the Q sets of power control parameters are configured for a plurality of panels to transmit an uplink signal. Q≥1, and Q is a positive integer. The K panels are a plurality of panels of the terminal, K≤L, and L represents a quantity of panels of the terminal.

Manner 2: Configure a power control parameter based on a transmission mode.

Specifically, the N sets of power control parameters may be configured for the M uplink resources/resource sets based on the transmission mode. One transmission mode may correspond to one or more sets of power control parameters.

Herein, the transmission mode may include one or more of single-panel transmission, multi-panel transmission, single-TRP transmission, and multi-TRP transmission. The multi-panel transmission may specifically include two-panel transmission, three-panel transmission, four-panel transmission, or the like. The single-TRP transmission may include a dynamic point switching (DPS) transmission mode. The multi-TRP transmission mainly describes coordinated multipoint transmission/reception (CoMP), and the CoMP may include non-coherent joint transmission (NCJT), coherent joint transmission (CJT), joint transmission (JT), or the like.

Optionally, a total of two sets of power control parameters may be configured for the M uplink resources/resource sets, that is, N=2. In the two sets of power control parameters, one set of power control parameters is configured for single-panel transmission of an uplink signal, and the other set of power control parameters is configured for multi-panel transmission of an uplink signal.

Manner 3: The manner 3 is similar to the manner 1, but no power control parameter is configured for multi-panel transmission of an uplink signal.

Specifically, K sets of power control parameters are configured for the M uplink resources/resource sets, that is, N=K. The K sets of power control parameters are respectively configured for the K panels to separately transmit uplink signals. Power control parameters used by at least two panels to transmit uplink signals include a power control parameter used by each of the at least two panels to transmit an uplink signal.

In other words, a power control parameter used by each of a plurality of panels to transmit an uplink signal is reused as a power control parameter used by the plurality of panels to transmit uplink signals. Optionally, the power control parameters used by the plurality of panels to transmit uplink signals may further be used together with a scaling factor to ensure that a sum of transmission power of all the panels does not exceed maximum transmission power of the terminal. The K panels are a plurality of panels of the terminal, K≤L, and L represents a quantity of panels of the terminal.

With reference to the first aspect or the second aspect, in some optional embodiments, the first power control parameter may be determined in the following manners:

Manner 1: Determine the first power control parameter based on an implicit indication of the network device.

Specifically, the network device may send spatial relationship information of the M uplink resources/resource sets to the terminal. Correspondingly, the terminal may receive the spatial relationship information sent by the network device. A reference signal indicated by spatial relationship information of an uplink resource/resource set and an uplink signal carried in the uplink resource/resource set have a same spatial characteristic parameter. The reference signal indicated by the spatial relationship information is the source reference signal mentioned in the foregoing introduction content of the spatial relationship (e.g., Spatial Relation) information, and may include an SRS, a channel state information reference signal (CSI-RS), or the like.

Optionally, the terminal may determine the first power control parameter based on the spatial relationship information.

Optionally, the terminal may determine the first power control parameter based on the spatial relationship information in the following several implementations:

(1) In a first implementation, the first power control parameter may be determined based on panels used for reference signals indicated by the spatial relationship information of the M uplink resources/resource sets.

(2) In a second implementation, the first power control parameter may be determined based on a resource, a resource set, or a resource group to which reference signals indicated by the spatial relationship information of the M uplink resources/resource sets belong.

(3) In a third implementation, the first power control parameter may be determined based on a quantity of reference signals indicated by the spatial relationship information of the M uplink resources/resource sets.

Manner 2: Determine the first power control parameter based on an explicit indication of the network device.

Specifically, the network device may send one or more of the following indication information to the terminal: antenna panel switch indication information, antenna panel identifier information (panel ID), or indication information of the uplink signal transmission mode. Correspondingly, the terminal may receive the indication information sent by the network device. The uplink signal transmission mode may include single-panel transmission of an uplink signal and multi-panel transmission of an uplink signal. The information directly indicates a panel or a quantity of panels that should be used by the terminal to transmit the uplink signal on the M uplink resources/resource sets. The terminal may determine, based on one or more items in the information, the first power control parameter that needs to be used to transmit the uplink signal. In other words, the terminal may determine, based on the explicit indication of the network device, which set or sets of power control parameters are to be used.

The antenna panel switch indication information may indicate which panels are to be enabled, or which panels are to be disabled. If the switch indication information indicates which panels are to be disabled, enabled panels are terminal panels other than the disabled panels. The first power control parameter is a power control parameter corresponding to an enabled panel in the N sets of power control parameters. In a specific implementation, the antenna panel switch indication information may have a plurality of bits. One bit corresponds to one panel and indicates enabling or disabling of the panel. In actual application, the switch indication information may be alternatively implemented in another manner. This is not limited in this application.

A panel indicated by the antenna panel identifier information (panel ID) is a panel that should be used by the terminal to transmit the uplink signal on the M uplink resources/resource sets. The first power control parameter is a power control parameter corresponding to the panel indicated by the identifier information in the N sets of power control parameters.

An implementation of determining the first power control parameter based on the indication information of the uplink signal transmission mode is applicable to the foregoing manner 2 for configuring the N sets of power control parameters. The first power control parameter is a set of power control parameters corresponding to the uplink signal transmission mode.

In this application, a reference signal (for example, an SRS or a CSI-RS) indicated by the higher-layer parameter constitutes no limitation. The reference signal indicated by the spatial relationship information in this application may further include a reference signal (for example, a CSI-RS) associated with an uplink resource/resource set used for non-codebook transmission (for example, an SRS resource set in non-codebook usage). Herein, the reference signal associated with the uplink resource/resource set used for non-codebook transmission is a reference signal having a quasi co-location (QCL) relationship or a spatial relationship with an uplink signal carried in the uplink resource/resource set used for non-codebook transmission.

In this application, the single-panel transmission means that the terminal device transmits one or more uplink signals in a first time unit through one panel. The multi-panel transmission means that the terminal device transmits one or more uplink signals in a first time unit through at least two panels. Optionally, when a plurality of uplink signals are transmitted through a plurality of panels, at least some of the plurality of uplink signals overlap in time. The first time unit may be one or more symbols, one or more slots, one or more subframes, or the like.

According to a third aspect, this application provides a signal transmission method, applied to a terminal side. The method may include: if H antenna panels of a terminal are used to transmit uplink signals on M uplink resources or uplink resource sets, and a sum of first transmission power that respectively corresponds to the H antenna panels and that is determined based on power control parameters respectively corresponding to the H antenna panels is greater than maximum transmission power of the terminal, the terminal may determine second transmission power respectively corresponding to at least one of the H antenna panels. On the M uplink resources or uplink resource sets, the terminal may transmit an uplink signal through the at least one antenna panel based on the second transmission power respectively corresponding to the at least one antenna panel. A sum of the second transmission power respectively corresponding to the at least one antenna panel is less than or equal to the maximum transmission power of the terminal. H≥2, and H is a positive integer.

According to a fourth aspect, this application provides a signal transmission method, applied to a network device side. The method may include: a network device sending configuration information to a terminal, where the configuration information indicates power control parameters configured for H uplink signals, H≥2, H is a positive integer, the H uplink signals are carried in a first time unit, and a sum of first transmission power that respectively corresponds to the H uplink signals and that is determined based on the power control parameters respectively corresponding to the H uplink signals is greater than maximum transmission power of the terminal. The network device receives at least one of the H uplink signals in the first time unit, where a sum of second transmission power respectively corresponding to the at least one uplink signal is less than or equal to the maximum transmission power of the terminal, and the second transmission power respectively corresponding to the at least one uplink signal is determined based on channel quality information of reference signals respectively related to the H uplink signals.

In a possible case, no transmission power is allocated to some of the H uplink signals, or none of the some uplink signals is transmitted.

With reference to the third aspect or the fourth aspect, in some optional embodiments, the configuration information may specifically indicate power control parameters configured for the M uplink resources/resource sets. The power control parameters configured for the M uplink resources/resource sets may include the power control parameters configured for the H uplink signals. A plurality of sets of power control parameters may be configured for the M uplink resources/resource sets (refer to a solution 1), or only one set of power control parameters may be configured for the M uplink resources/resource sets.

With reference to the third aspect or the fourth aspect, in some optional embodiments, a plurality of sets of power control parameters, namely, the N sets of power control parameters configured in the solutions described in the first aspect and the second aspect, may be configured for the M uplink resources/resource sets. In this case, the power control parameters respectively corresponding to the H antenna panels are the N sets of power control parameters.

In a scenario in which the plurality of sets of power control parameters are configured for the M uplink resources/resource sets, transmission power may be allocated, according to the following method, to an uplink signal corresponding to each panel:

(1) How to determine the first transmission power respectively corresponding to the H uplink signals is first described.

Specifically, referring to the foregoing solution, it can be learned that the terminal may determine, based on an implicit indication (that is, spatial relationship information) or an explicit indication (that is, panel switch indication information, a panel ID, or the like) of the network device, the power control parameters used by the terminal to transmit the H uplink signals, namely, the first power control parameter mentioned in the foregoing solution. Then, the terminal may determine, based on the first power control parameter, the first transmission power respectively corresponding to the H uplink signals.

(2) Then, the second transmission power corresponding to the at least one of the H uplink signals is determined.

The terminal may preferentially allocate, based on a path loss related to each uplink signal, transmission power to an uplink signal corresponding to an uplink signal with a lower path loss. In other words, power is allocated to an uplink signal with a lower path loss in preference to an uplink signal with a higher path loss.

Specifically, the terminal may perform at least one round of power allocation in ascending order of path losses related to the uplink signals.

In an $i^{th}$ (i is a positive integer, and i is less than or equal to H) round of power allocation, an uplink signal with a lowest current path loss is determined from uplink signals for which no second transmission power is determined, and may be represented as $S_{i\text{-}minPL}$ Actual transmission power allocated to $S_{i\text{-}minPL}$ may be min{$P'_i$, Pmax}. Herein, the actual transmission power of $S_{i\text{-}minPL}$ is second transmission power corresponding to $S_{i\text{-}minPL}$, Pmax represents the maximum transmission power of the terminal, and min represents selecting a minimum value. $P_{i\text{-}r}$ represents remaining transmission power obtained after transmission power allocated in previous i–1 rounds is subtracted from the maximum transmission power of the terminal. $P'_i$ represents first transmission power corresponding to $S_{i\text{-}minPL}$.

Specifically, the $i^{th}$ round of power allocation may be expressed according to the following algorithm:

$$P_i=\min\{P_r,P1\}.$$

Herein, when i=1, Pr=Pmax, or when i>1, Pr= Pmax−$P_{i-1}$− . . . −$P_1$.

Herein, $P_i$ represents the second transmission power corresponding to $S_{i\text{-}minPL}$, $P'_i$
represents the first transmission power corresponding to $S_{i\text{-}minPL}$ Pmax represents the maximum transmission power of the terminal, Pr represents the remaining transmission power obtained after the transmission power allocated in the previous i–1 rounds of power allocation is subtracted from the maximum transmission power of the terminal, 0≤Pr≤Pmax, and $S_{i\text{-}minPL}$ corresponds to an antenna panel that has a lowest path loss and for which no second transmission power is determined in the $i^{th}$ round of power allocation.

Optionally, a path loss related to an uplink signal transmitted by each panel may be obtained through calculation based on a reference signal that corresponds to the uplink signal transmitted by each panel and that is used for path loss estimation.

With reference to the third aspect or the fourth aspect, in some optional embodiments, only one set of power control parameters may be configured for the M uplink resources/ resource sets. In this case, the power control parameters respectively corresponding to the H uplink signals are a same set of power control parameters.

In a scenario in which only one set of power control parameters is configured for the M uplink resources/resource sets, the terminal may determine, based on the set of power control parameters, first transmission power corresponding to an uplink signal transmitted by each of the H panels. However, it needs to be considered that path losses respectively corresponding to the panels are different.

Specifically, the first transmission power corresponding to the uplink signal transmitted by each of the H antenna panels may be determined based on the following parameters included in the set of power control parameters: target reception power p0 of the uplink signal, a path loss compensation factor alpha, and a path loss obtained through measurement based on a reference signal indicated by spatial relationship information of the uplink signal transmitted by each of the H panels.

In the scenario in which only one set of power control parameters is configured for the M uplink resources/resource sets, the terminal may also preferentially allocate, based on a path loss related to each uplink signal, transmission power to an uplink signal corresponding to an uplink signal with a lower path loss. For a specific implementation, refer to the power allocation manner in the foregoing scenario in which the N sets of power control parameters are configured for the M uplink resources/resource sets.

With reference to the third aspect or the fourth aspect, in some optional embodiments, a quantity of panels may be determined based on one or more of the following: a quantity of pieces of spatial relationship information of the M uplink resources/resource sets, a quantity of reference signals indicated by the spatial relationship information, and a resource, a resource set, or a resource group to which the reference signals (for example, an SRS used for beam training) indicated by the spatial relationship information belong.

With reference to the third aspect or the fourth aspect, in some optional embodiments, a path loss related to an uplink signal transmitted by each panel may be obtained through calculation based on a reference signal that corresponds to the uplink signal transmitted by each panel and that is used for path loss estimation. Optionally, a reference signal that corresponds to an uplink signal transmitted by a panel and that is used for path loss estimation may be a reference signal indicated by spatial relationship information of the uplink signal. Optionally, a reference signal that corresponds to an uplink signal transmitted by a panel and that is used for path loss estimation may be a path loss reference signal included in a power control parameter corresponding to the uplink signal transmitted by the panel.

In the solutions described in the third aspect and the fourth aspect, transmission power is preferentially allocated to an uplink signal corresponding to a panel with a lower PL, so that transmission quality of a transmission path with a lower PL can be ensured, and system robustness and stability can be improved.

According to a fifth aspect, a terminal is provided, including a plurality of function units, configured to correspondingly perform the method provided in any one of the possible implementations of the first aspect.

According to a sixth aspect, a network device is provided, including a plurality of function units, configured to correspondingly perform the method provided in any one of the possible implementations of the second aspect.

According to a seventh aspect, a terminal is provided, including a plurality of function units, configured to correspondingly perform the method provided in any one of the possible implementations of the third aspect.

According to an eighth aspect, a network device is provided, including a plurality of function units, configured to correspondingly perform the method provided in any one of the possible implementations of the fourth aspect.

According to a ninth aspect, a terminal is provided, configured to perform the signal transmission method described in the first aspect. The terminal may include a memory, and a processor, a transmitter, and a receiver that are coupled to the memory. The transmitter is configured to send a signal to another wireless communications device such as a network device. The receiver is configured to receive a signal sent by the another wireless communications device such as the network device. The memory is configured to store implementation code of the signal transmission method described in the first aspect. The processor is configured to execute the program code stored in the memory, that is, perform the signal transmission method described in any one of the possible implementations of the first aspect.

According to a tenth aspect, a network device is provided, configured to perform the signal transmission method described in the second aspect. The network device may include a memory, and a processor, a transmitter, and a receiver that are coupled to the memory. The transmitter is configured to send a signal to another wireless communications device such as a terminal. The receiver is configured to receive a signal sent by the another wireless communications device such as the terminal. The memory is configured to store implementation code of the signal transmission method described in the second aspect. The processor is configured to execute the program code stored in the memory, that is, perform the signal transmission method described in any one of the possible implementations of the second aspect.

According to an eleventh aspect, a terminal is provided, configured to perform the signal transmission method described in the third aspect. The terminal may include a memory, and a processor, a transmitter, and a receiver that are coupled to the memory. The transmitter is configured to send a signal to another wireless communications device such as a network device. The receiver is configured to receive a signal sent by the another wireless communications device such as the network device. The memory is configured to store implementation code of the signal transmission method described in the third aspect. The processor is configured to execute the program code stored in the memory, that is, perform the signal transmission method described in any one of the possible implementations of the third aspect.

According to a twelfth aspect, a network device is provided, configured to perform the signal transmission method described in the fourth aspect. The network device may include a memory, and a processor, a transmitter, and a receiver that are coupled to the memory. The transmitter is configured to send a signal to another wireless communications device such as a terminal. The receiver is configured to receive a signal sent by the another wireless communications device such as the terminal. The memory is configured to store implementation code of the signal transmission method described in the fourth aspect. The processor is configured to execute the program code stored in the memory, that is, perform the signal transmission method described in any one of the possible implementations of the fourth aspect.

According to a thirteenth aspect, a communications system is provided. The communications system includes a network device and a terminal. The terminal device may be the terminal described in the first aspect. The network device may be the network device described in the second aspect.

According to a fourteenth aspect, a communications system is provided. The communications system includes a network device and a terminal. The terminal device may be the terminal described in the third aspect. The terminal may be the network device described in the fourth aspect.

According to a fifteenth aspect, a computer-readable storage medium is provided. The readable storage medium stores an instruction, and when the instruction is run on a computer, the computer is enabled to perform the signal transmission method described in the first aspect, the second aspect, the third aspect, or the fourth aspect.

According to a sixteenth aspect, a computer program product including an instruction is provided. When the computer program product is run on a computer, the computer is enabled to perform the signal transmission method described in the first aspect, the second aspect, the third aspect, or the fourth aspect.

BRIEF DESCRIPTION OF DRAWINGS

To describe the technical solutions in the embodiments of this application or in the background more clearly, the following describes the accompanying drawings for describing the embodiments of this application or the background.

FIG. 2 is an example schematic diagram of an SRS-ResourceSet IE defined in an existing protocol;

FIG. 3 is an example schematic diagram of a PUSCH-PowerControl IE defined in an existing protocol;

FIG. 4A and FIG. 4B are example schematic diagrams of a PUCCH-Config IE and a PUCCH-PowerControl IE that are defined in an existing protocol;

DESCRIPTION OF EMBODIMENTS

Terms used in embodiments of this application are only used to explain specific embodiments of this application, but are not intended to limit this application.

Figure 1:
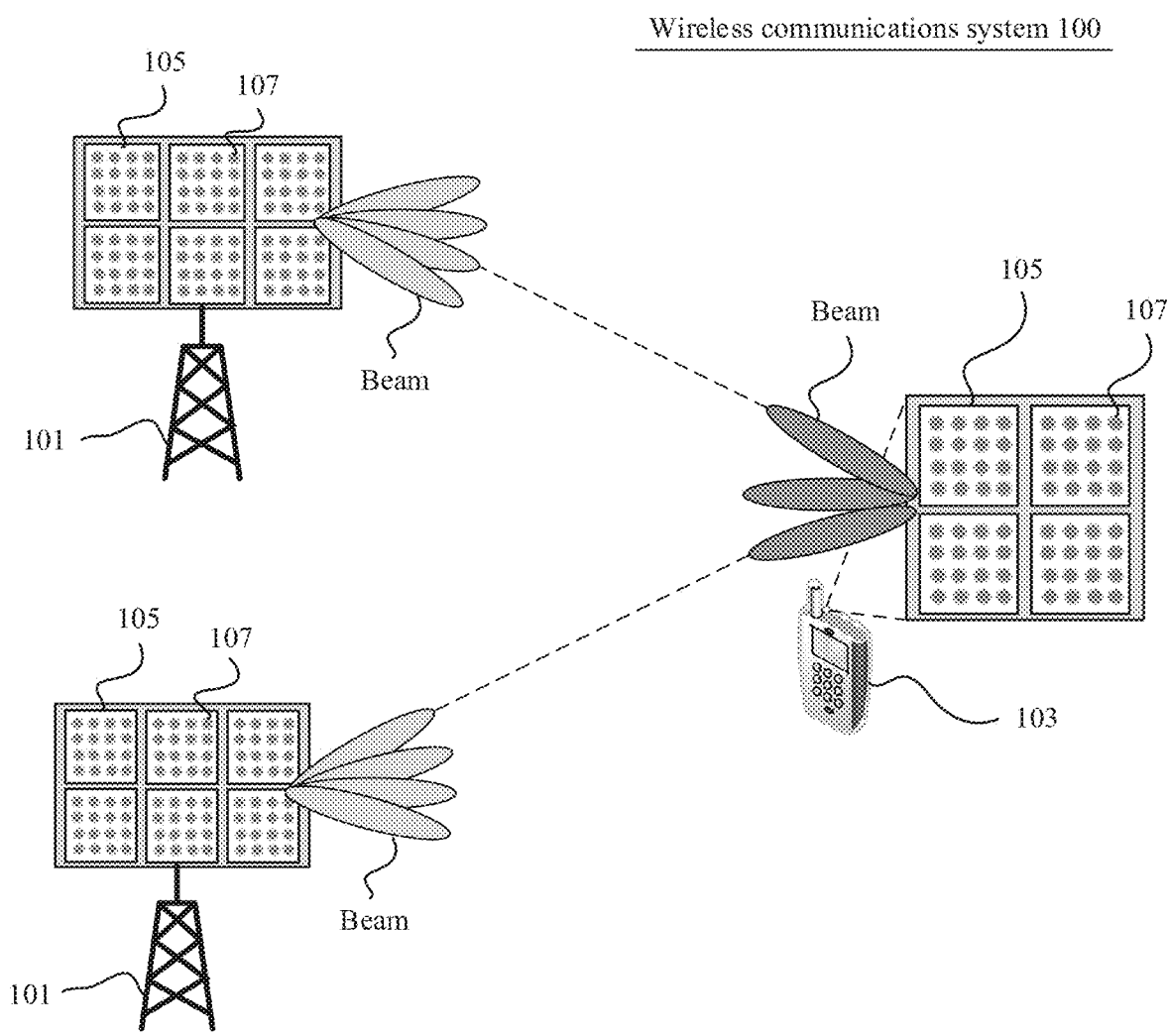
FIG. 1 is an example schematic architectural diagram of a wireless communications system according to this application.

FIG. 1 shows a wireless communications system 100 according to this application. The wireless communications system 100 may work in a high frequency band, and is not limited to a long term evolution (LTE) system. The wireless communications system 100 may alternatively be a 5th generation (5G) mobile communications system, a new radio (NR) system, a machine to machine (M2M) communications system, or a future communications system such as a 6th generation mobile communications system. As shown in FIG. 1, the wireless communications system 100 may include one or more network devices 101, one or more terminals 103, and a core network (not shown).

The network device 101 may be a base station. The base station may be configured to communicate with one or more terminals, or may be configured to communicate with one or more base stations that have some terminal functions (for example, communication between a macro base station and a micro base station such as an access point). The base station may be a base transceiver station (BTS) in a time division synchronous code division multiple access (TD-SCDMA) system, an evolved NodeB (eNB) in an LTE system, or a gNodeB in a 5G system or a new radio system. Alternatively, the base station may be a transmission and reception point (TRP), an access point (AP), a central unit (CU), or another network entity, and may include some or all of functions of the foregoing network entities.

The terminals 103 may be distributed in the entire wireless communications system 100, and may be static or mobile. In some embodiments of this application, the terminal 103 may be user equipment (UE), a mobile device, a mobile station, a mobile unit, an M2M terminal, a wireless unit, a remote unit, a terminal agent, a mobile client, or the like.

In this application, the wireless communications system 100 is a multi-beam communications system.

As shown in FIG. 1, a plurality of antenna panels 105 are configured for the network device 101, and one antenna panel 105 includes a plurality of antenna elements 107. A plurality of antenna panels 105 are configured for the terminal 103, and one antenna panel 105 includes a plurality of antenna elements 107. A quantity of antenna panels 105 configured for the network device 101 may be different from or the same as a quantity of antenna panels 105 configured for the terminal 103. A quantity of antenna elements 107 included in a single antenna panel 105 of the network device 101 may be different from or the same as a quantity of antenna elements 107 included in a single antenna panel 105 of the terminal 103.

With continuous evolution of antenna packing technologies, the plurality of antenna panels of the network device 101 or the terminal 103 can present a low correlation, and the plurality of antenna panels may independently form transmit beams, so that one transmitter of the network device 101 or the terminal 103 can send a data stream through different transmit beams.

This application mainly discusses power control in uplink signal transmission in the wireless communications system 100. Power control in uplink signal transmission is a key to the entire wireless communications system. Sufficient transmit energy per bit that is required for satisfying quality of service (QoS) needs to be reached. In addition, interference to another user in the system needs to be minimized. To achieve these objectives, uplink power control needs to adapt to characteristics of radio transmission channels.

However, terminal-side power control for signals transmitted by different antenna panels of a same terminal is not described in content in an existing protocol.

The following briefly describes power control specified for an uplink signal such as a sounding reference signal (SRS), a physical uplink shared channel (PUSCH), or a physical uplink control channel (PUCCH) in the existing protocols 3GPP 38.331 R15 and 3GPP 38.213 R15.

1. SRS Power Control

FIG. 2 shows an SRS-ResourceSet field in an SRS-config 1E defined in the existing protocol 3GPP 38.331 R15. As shown in FIG. 2, in the existing protocol, an SRS power allocation manner is that reference signals in each SRS resource set share a same set of power control parameters. Herein, the power control parameters include alpha, p0, and pathlossReferenceRS. Herein, alpha represents a path loss compensation factor, p0 represents target reception power, and pathlossReferenceRS represents a reference signal used for path loss estimation.

Based on the power control parameters defined in the SRS-ResourceSet field, the existing protocol 3GPP 38.213 R15 specifies SRS transmission power. Details are as follows:

If UE uses an SRS power control adjustment state with an index/on a carrier f of a serving cell c, transmission power used by the UE to send an SRS in an SRS transmission occasion i is $P_{SRS,b,f,c}(i,q_s,l)$:

$$P_{SRS,b,f,c}(i, q_s, l) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{array} \right\}$$

where $P_{CMAX,f,c}(i)$ is the UE transmission power configured for the carrier f of the serving cell c in the SRS transmission occasion i.

$P_{O\_SRS,b,f,c}(q)$ is provided by a higher-layer parameter p0 for an uplink bandwidth part (BWP) b of the carrier f of the serving cell c. The SRS resource set $q_s$ is provided by higher-layer parameters SRS-ResourceSet and SRS-ResourceSetId. $P_{O\_SRS,b,f,c}(q_s)$ is used to represent target reception power.

$M_{SRS,b,f,c}(i)$ is an SRS transmission bandwidth configured for the uplink BWP b of the carrier f of serving cells c and μ in the SRS transmission occasion i, and is expressed in a quantity of resource blocks.

$\alpha_{SRS,b,f,c}(q_s)$ is provided by a higher-layer parameter alpha for the SRS resource set $q_s$ of the uplink BWP b of the carrier f of the serving cell c, and is a path loss compensation factor.

$PL_{b,f,c}(q_d)$ is a path loss calculated by the UE by using an index $q_d$ of a reference signal on a downlink BWP. The reference signal is paired with the SRS resource set $q_s$ of the uplink BWP b of the carrier f of the serving cell c. The reference signal index $q_d$ associated with the SRS resource set $q_s$ is ssb-Index (which is a resource index used to indicate an SS/PBCH) in a higher-layer parameter pathlossReferenceRS or csi-RS-Index (which is a resource index used to indicate a CSI-RS) in a higher-layer parameter pathlossReferenceRS. $PL_{b,f,c}(q_d)$ is an RSRP-based path loss measurement value of the terminal.

For another parameter in the foregoing algorithm and a calculation method of a value of the another parameter, refer to the protocol 3GPP 38.213 R15.

It can be learned that the existing protocol specifies that each SRS resource set uses one set of power control parameters. In other words, all reference signals in one SRS resource set are transmitted at same power. An open-loop power control parameter of the SRS is configured by using higher-layer signaling. When the UE uses a plurality of panels to transmit SRSs to a plurality of panels of one TRP or to a plurality of TRPs, paths of the plurality of panels of the UE are different, and channel conditions are also different. If a same power control parameter is still used, power utilization is low. In addition, when SRSs carried in one SRS resource set are sent through a plurality of panels, if each panel uses a power control parameter specified in the existing protocol, total transmission power of the plurality of panels may exceed maximum transmission power of the UE.

2. PUSCH Power Control

In the prior art, PUSCH power allocation is determined by using higher-layer signaling, or is determined by using both higher-layer signaling radio resource control (RRC) and physical-layer signaling downlink control information (DCI). The RRC signaling is used to configure an open-loop power control parameter, and the DCI is used to indicate a closed-loop power control parameter. However, in a specific scenario (for example, an initial access scenario, a grant free scenario, or a with grant scenario), one PUSCH resource corresponds to only one set of power control parameters.

FIG. 3 shows a PUSCH-config IE defined in the existing protocol 3GPP 38.331 R15, where PUSCH power control parameters are defined. Herein, the power control parameters include msg3-Alpha, p0-NominalWithoutGrant, P0-PUSCH-AlphaSet, and PUSCH-PathlossReferenceRS, and ConfiguredGrantConfig indicates P0-PUSCH-AlphaSetId. Herein, msg3-Alpha represents a path loss compensation factor, p0-NominalWithoutGrant represents target reception power, and PUSCH-PathlossReferenceRS represents a reference signal used for path loss estimation.

Based on the power control parameters defined in the PUSCH-config 1E, the existing protocol 3GPP 38.213 R15 specifies PUSCH transmission power. Details are as follows:

If UE uses a set configuration with an index j and an PUSCH power control adjustment state with an index l on a carrier f of a serving cell c, the UE determines that transmission power of a PUSCH in a transmission occasion i is $P_{PUSCH,b,f,c}(i,j,q_d,l)$:

$$P_{PUSCH,b,f,c}(i, j, q_d, l) = \min \begin{Bmatrix} P_{CMAX,f,c}(i), \\ P_{0\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{Bmatrix} [dBm],$$

where
- $P_{CMAX,f,c}(i)$ is the UE transmission power configured for the carrier f of the serving cell c in the PUSCH transmission occasion i.
- $P_{O\_PUSCH,b,f,c}(j)$ s a parameter composed of a sum of a component $P_{O\_NOMINAL\_PUSCH,f,c}(j)$ and a component $P_{O\_UE\_PUSCH,b,f,c}(j)$ and $j \in \{0,1,\ldots, J-1\}$.
- $M_{RB,b,f,c}^{PUSCH}(i)$ is a PUSCH resource assignment bandwidth configured for an uplink BWP b of the carrier f of serving cells c and μ in the PUSCH transmission occasion i, and is expressed in a quantity of resource blocks.
- $PL_{b,f,c}(q_d)$ is a path loss calculated by the UE by using an index $q_d$ of a reference signal on a downlink BWP. The reference signal is paired with an SRS resource set $q_s$ of the uplink BWP b of the carrier f of the serving cell c.

For another parameter in the foregoing algorithm and a calculation method of a value of the another parameter, refer to the protocol 3GPP 38.213 R15.

It can be learned that the PUSCH power control parameters are configured by using higher-layer signaling or by using a combination of higher-layer signaling and physical-layer signaling. However, each PUSCH resource corresponds to only one set of power control parameters. When the UE uses a plurality of panels to transmit PUSCHs to a plurality of panels of one TRP or to a plurality of TRPs, transmission paths of the plurality of panels of the UE are different, and channel conditions are also different. If a same power control parameter is still used, power utilization is low. In addition, when PUSCHs carried in one PUSCH resource are sent through a plurality of panels, if each panel uses a power control parameter specified in the existing protocol, total transmission power of the plurality of panels may exceed maximum transmission power of the UE.

3. PUCCH Power Control

FIG. 4A and FIG. 4B shows a PUCCH-config 1E and a PUCCH-PowerControl IE defined in the existing protocol 3GPP 38.331 R15, where PUCCH power control parameters are defined. It can be learned that in the existing protocol, a PUCCH resource set list indicated by a higher-layer parameter resourceSetToAddModList/resourceSetToReleaseList corresponds to one set of power control parameters, that is, one or more PUCCH resource sets included in one PUCCH resource set list correspond to one set of power control parameters. A PUCCH resource list indicated by a higher-layer parameter resourceToAddModList/resourceToReleaseList corresponds to one set of power control parameters, that is, one or more PUCCH resources included in one PUCCH resource list correspond to one set of power control parameters. In summary, in the existing protocol, one PUCCH resource set list or resource list corresponds to only one set of power control parameters.

The PUCCH-PowerControl IE defines power control parameters, which specifically include P0-PUCCH and PUCCH-PathlossReferenceRS. Herein, P0-PUCCH represents target reception power, and PUCCH-PathlossReferenceRS represents a reference signal used for path loss estimation. For a PUCCH, a value range of a path loss compensation factor may be 0 to 1. To ensure high reliability of the PUCCH, transmission power of the PUCCH is made as high as possible. A value of the path loss compensation factor may be determined based on an actual situation.

In the existing protocol, a manner for determining PUCCH transmission power based on a PUCCH power control parameter is similar to a power control mechanism for an SRS and a power control mechanism for a PUSCH. For details, refer to 3GPP 38.331 R15 and 3GPP 38.213 R15. The PUCCH has the same problem as the SRS and the PUSCH.

In addition, the existing protocol also defines, for an uplink channel such as a PRACH, a power control mechanism similar to those for the SRS, the PUSCH, and the PUCCH. For details, refer to 3GPP 38.331 R15 and 3GPP 38.213 R15. The PRACH has the same problem as the SRS, the PUSCH, and the PUCCH.

To resolve the existing technical problem and adapt to uplink power control of a multi-panel terminal, this application provides a signal transmission method. Detailed descriptions are provided below.

Concepts in this application are first described.

(1) Spatial relationship information: used to assist in describing transmit-side beamforming information and a transmission process of a terminal.

The spatial relationship information is used to indicate a spatial reception parameter or spatial transmission parameter relationship between two types of reference signals or channels. The two types of reference signals or channels include a target reference signal or channel and a source reference signal or channel. The target reference signal or channel is an uplink reference signal or channel transmitted by the terminal, and may be usually a demodulation reference signal (DMRS), a sounding reference signal (SRS), a PUSCH, a PUCCH, or the like. The source reference signal or channel (which may also be referred to as a referenced reference signal or channel) may be usually a channel state information reference signal (CSI-RS), a sounding reference signal (SRS), a synchronization signal/PBCH block (SS/PBCH block), or the like.

Spatial characteristic parameters that are of the two reference signals or channels and that satisfy the spatial relationship information are the same, so that a spatial characteristic parameter of the target reference signal can be inferred based on a resource index of the source reference signal.

Optionally, the spatial characteristic parameter includes one or more of the following parameters: an angle of arrival (AoA), a dominant angle of arrival (AoA), an average angle of arrival, a power angular spectrum (PAS) of an angle of arrival, an angle of departure (AoD), a dominant angle of departure, an average angle of departure, a power angular spectrum of an angle of departure, terminal's transmit beamforming, terminal's receive beamforming, a spatial channel correlation, base station's transmit beamforming, base station's receive beamforming, an average channel gain, an average delay, a delay spread, a Doppler spread, a Doppler shift, a spatial reception parameter (spatial Rx parameters), a spatial transmission parameter (spatial Tx parameters), and the like.

These spatial characteristic parameters describe characteristics of a spatial channel between an antenna port of the source reference signal and an antenna port of the target reference signal, and help the terminal device complete a transmit-side beamforming process or a transmission processing process based on the spatial relationship information. The terminal may transmit the target reference signal or channel based on transmit beam information that is of the source reference signal and that is indicated by the spatial relationship information.

(2) Beam

The beam is a communications resource. The beam may be a wide beam, a narrow beam, or a beam of another type. A technology for forming the beam may be a beamforming technology or another technology. The beamforming technology may be specifically a digital beamforming technology, an analog beamforming technology, or a mixed digital/analog beamforming technology. Different beams may be considered as different resources. Same information or different information may be sent on different beams. Optionally, a plurality of beams having a same communication feature or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted through an antenna, and a receive beam may be distribution of signal strength, in different directions in space, of a radio signal received from an antenna. It may be understood that, one or more antenna ports forming one beam may also be considered as one antenna port set.

Beams may be classified into a transmit beam and a receive beam of a network device, and a transmit beam and a receive beam of a terminal device. The transmit beam of the network device is used to describe transmit-side beamforming information of the network device, and the receive beam of the base station is used to describe receive-side beamforming information of the network device. The transmit beam of the terminal device is used to describe transmit-side beamforming information of the terminal device, and the receive beam of the terminal is used to describe receive-side beamforming information of the terminal device. In other words, the beam is used to describe beamforming information.

The beam may correspond to a time resource, and/or a space resource, and/or a frequency domain resource.

Optionally, the beam may further correspond to a reference signal resource (for example, a reference signal resource for beamforming) or beamforming information. In other words, indicating the beam is equivalent to indicating the reference signal resource or the beamforming information.

Optionally, the beam may further correspond to information associated with the reference signal resource. The reference signal may be a CSI-RS, an SSB, a DMRS, a phase tracking reference signal (PTRS), a tracking reference signal (TRS) (or CSI-RS for tracking), an SRS, or the like, and the information associated with the reference signal resource may be a reference signal resource identifier, QCL information (particularly type-D QCL), spatial relationship information, or the like. The reference signal resource identifier corresponds to a transmit-receive beam pair that is previously established during measurement based on the reference signal resource. The terminal may infer beam information based on the reference signal resource index. In other words, indicating the beam is equivalent to indicating the information associated with the reference signal, for example, the reference signal resource identifier, the QCL information, or the spatial relationship information.

Optionally, the beam may further correspond to a spatial domain filter (spatial filter) or a spatial domain transmission filter. In other words, indicating the beam is equivalent to indicating the spatial domain filter or the spatial domain transmission filter.

Then, the technical solutions provided in this application are described.

(1) Solution 1: In a scenario in which a terminal has L (L>1, and L is a positive integer) panels, N (N>1, and N is a positive integer) sets of power control parameters are configured for M (M≥1, and M is a positive integer) uplink resources or uplink resource sets (uplink resources/resource sets). The N sets of power control parameters are configured based on K (K≤L, and K is a positive integer) panels of the terminal. To be specific, there is a mapping relationship between the N sets of power control parameters and a plurality of panels of the terminal.

Optionally, each of the M uplink resources/resource sets is associated with the N sets of power control parameters. Herein, that each of the M uplink resources/resource sets is associated with the N sets of power control parameters means that a power control parameter corresponding to each of the M uplink resources/resource sets may be selected from the N sets of power control parameters. In other words, the N sets of power control parameters are candidate power control parameters of each of the M uplink resources/resource sets.

Optionally, at least one of the M uplink resources/resource sets is associated with the N sets of power control parameters. Herein, that the at least one uplink resource/resource set is associated with the N sets of power control parameters means that a power control parameter corresponding to each of the at least one uplink resource/resource set may be selected from the N sets of power control parameters. In other words, the N sets of power control parameters are candidate power control parameters of the at least one uplink resource/resource set.

Optionally, at least one of the M uplink resources/resource sets is associated with at least one of the N sets of power control parameters. Herein, that the at least one uplink resource/resource set is associated with the at least two set of power control parameters means that a power control parameter corresponding to each of the at least one uplink resource/resource set may be selected from the at least two set of power control parameters. In other words, the at least two set of power control parameters is candidate power control parameters of the at least one uplink resource/resource set.

In the solution 1, a plurality of transmission paths corresponding to the plurality of panels of the terminal are considered, and a plurality of sets of power control parameters are configured for the M uplink resources/resource sets. In this way, the terminal may flexibly determine, based on spatial relationship information or other downlink information (for example, a panel switch indication, panel ID information, or a transmission mode), which set or sets of power control parameters are to be used, so that uplink transmission power can be more flexibly adjusted, and power efficiency in uplink transmission and uplink transmission performance can be maximized. Specific content of the solution 1 is described in detail in the following content.

(2) Solution 2: In a scenario in which an uplink signal such as an SRS, a PUCCH, or a PUSCH is transmitted by a plurality of panels, transmission power is allocated, based on a path loss (PL), to an uplink signal corresponding to each panel. Specifically, transmission power is preferentially allocated to an uplink signal corresponding to a panel with a lower PL. The uplink signal corresponding to the panel is an uplink signal transmitted by the panel. The transmission power is preferentially allocated to the uplink signal corresponding to the panel with a lower PL, so that transmission quality of a transmission path with a lower PL can be ensured, and system robustness and stability can be improved. Specific content of the solution 2 is described in detail in the following content.

In this application, the power control parameter may include one or more of the following: target reception power of an uplink signal, a path loss compensation factor, and a path loss reference signal. The target reception power P0 is lowest signal strength at which a network device can demodulate the uplink signal, or is reception power at which a network device expects to receive the uplink signal. The path loss compensation factor alpha/a is used by the network device to determine a weight of a path loss in uplink power control. The path loss reference signal pathloss RS means that the terminal estimates a downlink path loss (PL) based on strength of a received reference signal for estimating a path loss and considers that an uplink path loss is equivalent to the downlink path loss. Optionally, for an SRS or a PUSCH, the power control parameter may include the target reception power of the uplink signal, the path loss compensation factor, and the path loss reference signal. Optionally, for a PUCCH, the power control parameter may include the path loss reference signal and the target reception power of the uplink signal.

Figure 5:
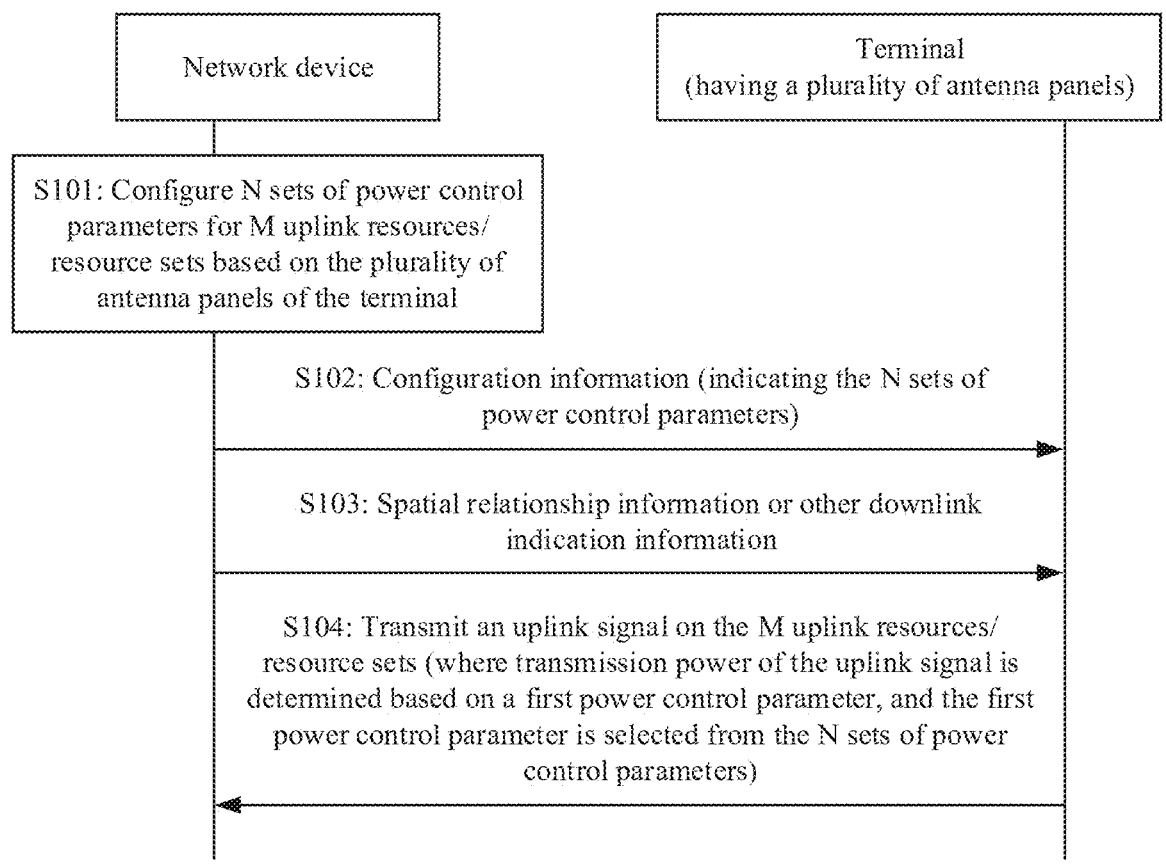
FIG. 5 is an overall example schematic flowchart of a signal transmission method according to this application.

The following describes the solution 1 in detail. The solution 1 mainly discusses how to configure, for a multi-panel terminal, a power control parameter for transmitting an uplink signal. FIG. 5 is an overall flowchart of a signal transmission method described in the solution 1. The method may include the following steps.

S101: A network device configures N sets of power control parameters for M uplink resources/resource sets. The N sets of power control parameters are configured based on a plurality of panels of a terminal. The plurality of panels may be some or all panels of the terminal. A quantity of the plurality of panels is K, K≤L, and K is a positive integer.

Optionally, the terminal may report the quantity of panels or the panels of the terminal to the network device, or the terminal reports the quantity of panels or a panel ID of the terminal by using a terminal capability parameter.

S102: The network device sends configuration information to the terminal. The configuration information indicates the N sets of power control parameters configured for the M uplink resources/resource sets. Correspondingly, the terminal device receives the configuration information sent by the network device.

Optionally, the configuration information may indicate a mapping between a panel and a power control parameter. Optionally, the configuration information may alternatively indicate only the N sets of power control parameters, a mapping between the N sets of power control parameters and panels may comply with a preset mapping rule, and the preset mapping rule is known to the terminal. For example, the preset mapping rule may be that the power control parameters are sequentially mapped to the panels. To be specific, the first set of power control parameters corresponds to the first panel, the second set of power control parameters corresponds to the second panel, and so on. In this example, the configuration information indicates only the N sets of power control parameters, and does not need to indicate the mapping between the power control parameters and the panels. The terminal learns of the mapping between the power control parameters and the panels according to the preset mapping rule, so that signaling overhead can be reduced. The example is merely used to explain this application. The preset mapping rule is not limited in this application.

Optionally, the preset mapping rule may be predefined according to a protocol, or may be indicated by using signaling sent by the network device. When the preset mapping rule is indicated by using the signaling sent by the network device, the signaling may be the same as or different from signaling used by the network device to indicate the N sets of power control parameters.

Optionally, the network device may transmit the configuration information by using signaling such as radio resource control (RRC) signaling. In other words, the network device may configure the N sets of power control parameters in a static configuration manner. Alternatively, the network device may transmit the configuration information by using signaling such as a media access control control element (MAC CE). In other words, the network device may configure the N sets of power control parameters in a semi-static configuration manner.

S103: The network device sends spatial relationship information or other downlink information (for example, panel switch indication information, a panel ID, or indication information of a transmission mode) to the terminal. Correspondingly, the terminal device receives the spatial relationship information or the other downlink information sent by the network device. The information may be used to determine a power control parameter to be used by the terminal to transmit an uplink signal on the M uplink resources/resource sets.

S104: The terminal device transmits the uplink signal on the M uplink resources/resource sets, where transmission power for transmitting the uplink signal on the M uplink resources/resource sets is determined based on a first power control parameter, and the first power control parameter is selected from the N sets of power control parameters.

The first power control parameter is a power control parameter used by the terminal to transmit the uplink signal on the M uplink resources/resource sets. The first power control parameter may be one or more sets of power control parameters in the N sets of power control parameters.

Optionally, the first power control parameter may be determined based on the spatial relationship information or the other downlink information sent by the network device. How to determine the first power control parameter is described in detail in the subsequently described aspect (2) in this application.

S103 in FIG. 5 may be an optional step. Alternatively, the first power control parameter may be predefined in a protocol, and the network device does not need to indicate the first power control parameter. The terminal may alternatively determine the first power control parameter based on information previously reported by the terminal, for example, a channel quality measurement report or identifier information of a panel with good channel quality, and the network device does not need to indicate the first power control parameter. The terminal may alternatively determine the first power control parameter based on a terminal-side measurement result, and the network device does not need to indicate the first power control parameter.

For different uplink signals, configuring the N sets of power control parameters for the M uplink resources/resource sets may be specifically as follows:

1. The N sets of power control parameters are configured for one SRS resource set. In this case, M=1. Different from that in the prior art, one SRS resource set no longer corresponds to only one set of power control parameters, but corresponds to a plurality of sets of power control parameters. This constitutes no limitation. Alternatively, a plurality of SRS resource sets may be bound together, and the N sets of power control parameters are configured for the plurality of SRS resource sets. In this case, M>1.

Configuring the N sets of power control parameters for the plurality of SRS resource sets may specifically include the following several cases:

Case 1: Optionally, a power control parameter corresponding to each of the plurality of SRS resource sets may be selected from the N sets of power control parameters.

Case 2: Optionally, a power control parameter corresponding to each of at least one of the plurality of SRS resource sets may be selected from the N sets of power control parameters.

Case 3: Optionally, a power control parameter corresponding to each of at least one of the plurality of SRS resource sets may be selected from at least two of the N sets of power control parameters.

For example, it is assumed that the plurality of SRS resource sets are an SRS resource set 0, an SRS resource set 1, and an SRS resource set 2, and the N sets of power control parameters are a parameter 0 to a parameter 3. In this case, the case 1 may be shown by using an example in Table 1, the case 2 may be shown by using an example in Table 2, and the case 3 may be shown by using an example in Table 3.

TABLE 1

| SRS resource set | Power control parameter |
| --- | --- |
| SRS resource set 0 | Parameter 0 to parameter 3 |
| SRS resource set 1 | |
| SRS resource set 2 | |

It can be learned from Table 1 that a power control parameter corresponding to each SRS resource set in the SRS resource set 0, the SRS resource set 1, and the SRS resource set 2 may be selected from the parameter 0 to the parameter 3.

TABLE 2

| SRS resource set | Power control parameter |
| --- | --- |
| SRS resource set 0 | Parameter 0 to parameter 3 |
| SRS resource set | Power control parameter |
| SRS resource set 1 | |
| SRS resource set 2 | Parameter 2 |

It can be learned from Table 2 that power control parameters corresponding to both the SRS resource set 0 and the SRS resource set 1 in the SRS resource set 0, the SRS resource set 1, and the SRS resource set 2 may be selected from the parameter 0 to the parameter 3, and a power control parameter corresponding to the SRS resource set 2 is the parameter 2.

TABLE 3

| SRS resource set | Power control parameter |
| --- | --- |
| SRS resource set 0 | Parameter 0 and parameter 1 |
| SRS resource set 1 | |
| SRS resource set 2 | Parameter 1 |

It can be learned from Table 3 that power control parameters corresponding to both the SRS resource set 0 and the SRS resource set 1 in the SRS resource set 0, the SRS resource set 1, and the SRS resource set 2 may be selected from the parameter 0 and the parameter 1, and a power control parameter corresponding to the SRS resource set 2 is the parameter 1.

2. The N sets of power control parameters are configured for one PUSCH resource. In this case, M=1. Different from that in the prior art, one PUSCH resource no longer corresponds to only one set of power control parameters, but corresponds to a plurality of sets of power control parameters. This constitutes no limitation. Alternatively, a plurality of PUSCH resources may be bound together, and the N sets of power control parameters are configured for the plurality of PUSCH resources. In this case, M>1.

Similarly, configuring the N sets of power control parameters for the plurality of PUSCH resources may specifically include the following several cases:

Case 1: Optionally, a power control parameter corresponding to each of the plurality of PUSCH resources may be selected from the N sets of power control parameters.

Case 2: Optionally, a power control parameter corresponding to each of at least one of the plurality of PUSCH resources may be selected from the N sets of power control parameters.

Case 3: Optionally, a power control parameter corresponding to each of at least one of the plurality of PUSCH resources may be selected from at least two of the N sets of power control parameters.

3. The N sets of power control parameters are configured for one PUCCH resource set list or resource list. One PUCCH resource set list includes M (M≥1, and M is a positive integer) PUCCH resource sets, and one PUCCH resource list includes M (M≥1, and M is a positive integer) PUCCH resources. Different from that in the prior art, one PUCCH resource set list or resource list no longer corresponds to only one set of power control parameters, but corresponds to a plurality of sets of power control parameters.

For power control of another uplink signal (for example, a PARCH), a specific implementation of configuring the N sets of power control parameters for the M uplink resources/resource sets may be similar to that in the foregoing descriptions of 1 to 3.

It can be learned that, in the solution 1, a plurality of transmission paths corresponding to the plurality of panels of the terminal are considered, and a plurality of sets of power control parameters are configured for the M uplink resources/resource sets. In this way, the terminal may select an appropriate power control parameter based on the spatial relationship information or the other downlink information (for example, the panel switch indication information, the panel ID, or the indication information of the transmission mode), to flexibly determine uplink transmission power, so as to improve power utilization of the terminal.

An SRS is used as an example for description. It is assumed that a power control parameter configured by the network device for each SRS resource set based on a panel-0 and a panel-1 of the terminal is shown in Table 4 (M=1, and N=3).

TABLE 4

| Antenna panel | SRS power control parameter |
| --- | --- |
| Panel-0 | Parameter 0 |
| Panel-1 | Parameter 1 |
| Panel-0 and panel-1 | Parameter 2 |

A meaning of Table 4 is as follows: A power control parameter used by the terminal to transmit the SRS through only the panel-0 is the parameter 0, a power control parameter used by the terminal to transmit the SRS through only the panel-1 is the parameter 1, and a power control parameter used by the terminal to transmit the SRS through the panel-0 and the panel-1 is the parameter 2.

It can be learned from the foregoing example that the power control parameter used by the terminal to transmit the SRS is determined based on the panel used by the terminal to transmit the SRS, and three different panel use situations are considered. The terminal may select a corresponding power control parameter from the three sets of power control parameters based on an actual panel use situation, to more flexibly adapt to an actual channel status, so as to improve power utilization.

In this application, single-panel transmission means that the terminal device transmits one or more uplink signals in a first time unit through one panel. Multi-panel transmission means that the terminal device transmits one or more uplink signals in a first time unit through at least two panels. Optionally, when a plurality of uplink signals are transmitted through a plurality of panels, at least some of the plurality of uplink signals overlap in time. The first time unit may be one or more symbols, one or more slots, one or more subframes, or the like.

Figure 6:
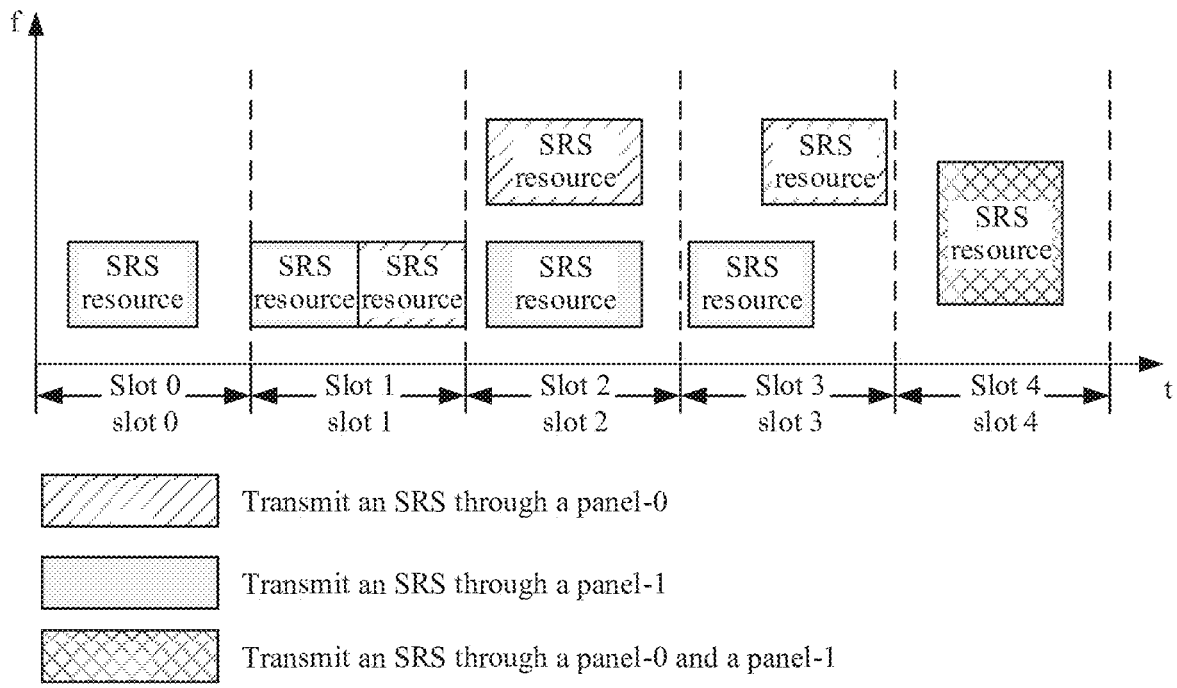
FIG. 6 is an example schematic diagram of several panels used to transmit an SRS on an SRS resource according to this application.

The following provides an example for description with reference to FIG. 6. If the first time unit is one slot, a slot 0 belongs to single-panel SRS transmission, and slots 1 to 4 all belong to multi-panel transmission. If the first time unit is an orthogonal frequency division multiplexing (OFDM) symbol, a slot 0 and a slot 1 belong to single-panel transmission, and a slot 2 and a slot 4 belong to multi-panel transmission. In a slot 3, a symbol in which an SRS transmitted by the panel-0 and an SRS transmitted by the panel-1 do not overlap belongs to single-panel transmission, and a symbol in which the SRS transmitted by the panel-0 and the SRS transmitted by the panel-1 overlap belongs to multi-panel transmission.

The following describes aspects (1) and (2) in the solution 1 in detail.

(1) Manner for configuring the N sets of power control parameters

Manner 1: Configure a power control parameter for each panel (per panel configuration manner).

Specifically, K+Q sets of power control parameters are configured for the M uplink resources/resource sets, that is, N=K+Q. The K sets of power control parameters are respectively configured for the K panels to separately transmit uplink signals, and the Q sets of power control parameters are configured for a plurality of panels to transmit an uplink signal. Q≥1, and Q is a positive integer. The K panels are a plurality of panels of the terminal, K≤L, and L represents a quantity of panels of the terminal.

The SRS is used as an example for description. If the K panels are the panel-0 and the panel-1, the N sets of power control parameters configured for all SRS resource sets in the manner 1 may be shown by using an example in Table 5.

TABLE 5

| Antenna panel | SRS power control parameter |
| --- | --- |
| Panel-0 | Parameter 0 |
| Panel-1 | Parameter 1 |
| Panel-0 and panel-1 | Parameter 2 |

Herein, details are as follows:

The parameter 0 is one set of power control parameters, and is configured for use when only the panel-0 is used to transmit the SRS.

The parameter 1 is one set of power control parameters, and is configured for use when only the panel-1 is used to transmit the SRS.

The parameter 2 may be one set of power control parameters (Q=1), which are configured for use when the panel-0 and the panel-1 are used to transmit the SRS. In this case, both transmission power control of the panel-0 and transmission power control of the panel-1 comply with the set of power control parameters. The parameter 2 may alternatively be two sets of power control parameters (Q=2), which are configured for use when the panel-0 and the panel-1 are used to transmit the SRS. In this case, transmission power control of the panel-0 complies with one set of power control parameters, and transmission power control of the panel-1 complies with the other set of power control parameters.

When the parameter 2 is two sets of power control parameters (Q=2), optionally, a set of power control parameters used for the panel-0 in the parameter 2 may be usually different from the parameter 0 (that is, a power control parameter used when only the panel-0 is used to transmit the SRS). Transmission power corresponding to the parameter 0 used when only the panel-0 is used to transmit the SRS is close to or equal to maximum transmission power of the terminal, to improve power utilization. However, when the panel-0 and the panel-1 are used to transmit the SRS, only a sum of transmission power respectively corresponding to the two sets of power control parameters included in the parameter 2 is close to or equal to the maximum transmission power of the terminal. Therefore, transmission power corresponding to the set of power control parameters used for the panel-0 in the parameter 2 is less than the transmission power corresponding to the parameter 0. Likewise, optionally, a set of power control parameters used for the panel-1 in the parameter 2 may be usually different from the parameter 1, and transmission power corresponding to the set of power control parameters used for the panel-1 in the parameter 2 is less than transmission power corresponding to the parameter 1.

Table 5 is merely used to explain an example of this application. A parameter in Table 5 and a parameter in another table that have a same name do not mean that values of the parameters are the same. In actual application, when K>2, there are more cases in which the SRS is transmitted through a plurality of panels, including a case in which the SRS is transmitted through two panels, a case in which the SRS is transmitted through three panels, a case in which the SRS is transmitted through four panels, and the like. In a case in which the SRS is transmitted through more than two panels, for an implementation of a configured power control parameter, refer to the implementation of the parameter 2 in Table 5. For example, in the case in which the SRS is transmitted through three panels, power control parameters configured for the three panels to transmit the SRS may be only one set of power control parameters. In this case, transmission power control of all of the three panels complies with the set of power control parameters. Alternatively, power control parameters configured for the three panels to transmit the SRS may be three sets of power control parameters. In this case, transmission power control of each of the three panels complies with one set of power control parameters. Alternatively, power control parameters configured for the three panels to transmit the SRS may be two sets of power control parameters. In this case, transmission power control of two of the three panels complies with one set of power control parameters, and transmission power control of the remaining one panel complies with the other set of power control parameters.

It can be learned that if the N sets of power control parameters are configured in the manner 1, when determining a panel to be used to transmit the uplink signal, the terminal may select, from the N sets of power control parameters, a power control parameter for transmitting the uplink signal, that is, the first power control parameter.

Manner 2: Configure a power control parameter based on a transmission mode.

Specifically, the N sets of power control parameters may be configured for the M uplink resources/resource sets based on the transmission mode. One transmission mode may correspond to one or more sets of power control parameters.

Herein, the transmission mode may include single-panel transmission, multi-panel transmission, single-TRP transmission, or multi-TRP transmission. The multi-panel transmission may specifically include two-panel transmission, three-panel transmission, four-panel transmission, or the like. The single-TRP transmission may include a DPS transmission mode. The multi-TRP transmission mainly describes coordinated multipoint transmission/reception (CoMP), and the CoMP may include non-coherent joint transmission (NCJT), coherent joint transmission (CJT), joint transmission (JT), or the like.

The SRS is used as an example for description. The N sets of power control parameters configured for all SRS resource sets in the manner 2 may be shown by using an example in Table 6.

TABLE 6

| Transmission mode | SRS power control parameter |
| --- | --- |
| Single-panel transmission | Parameter 0 |
| Two-panel transmission | Parameter 1 |
| Three-panel transmission | Parameter 2 |
| DPS | Parameter 3 |
| NCJT | Parameter 4 |
| CJT | Parameter 5 |
| JT | Parameter 6 |

Herein, details are as follows:

The parameter 0 is a power control parameter configured for single-panel transmission of the SRS. Optionally, the parameter 0 may be one set of power control parameters, or optionally, the parameter 0 may be a plurality of sets of power control parameters.

The parameter 1 is a power control parameter configured for two-panel transmission of the SRS. Optionally, the parameter 1 may be one set of power control parameters, or optionally, the parameter 1 may be a plurality of sets of power control parameters.

The parameter 2 is a power control parameter configured for three-panel transmission of the SRS. Optionally, the parameter 2 may be one set of power control parameters, or optionally, the parameter 2 may be a plurality of sets of power control parameters.

The parameter 3 is a power control parameter configured for use when the SRS is transmitted in the DSP transmission mode. Optionally, the parameter 3 may be one set of power control parameters, or optionally, the parameter 3 may be a plurality of sets of power control parameters.

The parameter 4 is a power control parameter configured for use when the SRS is transmitted in the NCJT transmission mode. Optionally, the parameter 4 may be one set of power control parameters, or optionally, the parameter 4 may be a plurality of sets of power control parameters.

The parameter 5 is a power control parameter configured for use when the SRS is transmitted in the CJT transmission mode. Optionally, the parameter 5 may be one set of power control parameters, or optionally, the parameter 5 may be a plurality of sets of power control parameters.

The parameter 6 is a power control parameter configured for use when the SRS is transmitted in the JT transmission mode. Optionally, the parameter 6 may be one set of power control parameters, or optionally, the parameter 6 may be a plurality of sets of power control parameters.

Optionally, a total of two sets of power control parameters may be configured for the M uplink resources/resource sets, that is, N=2. In the two sets of power control parameters, one set of power control parameters is configured for single-panel transmission of an uplink signal, and the other set of power control parameters is configured for multi-panel transmission of an uplink signal.

The SRS is used as an example for description. If the power control parameters are configured based on four panels (a panel-0 to a panel-3) of the terminal, the two sets of power control parameters configured for all SRS resource sets may be shown by using an example in Table 7.

TABLE 7

| Antenna panel | SRS power control parameter |
|---|---|
| Panel-0 | Parameter 0 |
| Panel-1 | |
| Panel-2 | |
| Panel-3 | |
| Panel-0 and panel-2 | Parameter 1 |
| Panel-1 and panel-3 | |
| Panel-0, panel-1, panel-2, and panel-3 | |

Herein, details are as follows:

The parameter 0 is one set of power control parameters, and is configured for single-panel transmission of the SRS.

The parameter 1 is one set of power control parameters, and is configured for multi-panel transmission of the SRS. In this case, transmission power control of each panel complies with the set of power control parameters.

In Table 7, single-panel transmission of the SRS includes four cases: Only the panel-0 is used to transmit the SRS, only the panel-1 is used to transmit the SRS, only the panel-2 is used to transmit the SRS, and only the panel-3 is used to transmit the SRS. Transmission power control of single-panel transmission in all of the four cases complies with the parameter 0. Multi-panel transmission of the SRS includes three cases: The panel-0 and the panel-2 are used to transmit the SRS, the panel-1 and the panel-3 are used to transmit the SRS, and the four panels: the panel-0 to the panel-3, are used to transmit the SRS. Transmission power control of multi-panel transmission in all of the three cases complies with the parameter 1. Table 7 is merely used to explain this application, but should not be construed as a limitation.

It can be learned that if the two sets of power control parameters are configured in the manner 2, when determining only a quantity of panels to be used to transmit the uplink signal, the terminal can determine a power control parameter for transmitting the uplink signal, that is, the first power control parameter.

Manner 3: The manner 3 is similar to the manner 1, but no power control parameter is configured for multi-panel transmission of an uplink signal.

Specifically, K sets of power control parameters are configured for the M uplink resources/resource sets, that is, N=K. The K sets of power control parameters are respectively configured for the K panels to separately transmit uplink signals. The K sets of power control parameters respectively correspond to the K antenna panels. Power control parameters used by at least two panels to transmit uplink signals include a power control parameter used by each of the at least two panels to transmit an uplink signal. The terminal may transmit an uplink signal on each antenna panel based on a power control parameter corresponding to each antenna panel.

In other words, a power control parameter used by each of a plurality of panels to transmit an uplink signal is reused as a power control parameter used by the plurality of panels to transmit uplink signals. Optionally, the power control parameters used by the plurality of panels to transmit uplink signals may further be used together with a scaling factor to ensure that a sum of transmission power of all the panels does not exceed the maximum transmission power of the terminal. The K panels are a plurality of panels of the terminal, K≤L, and L represents a quantity of panels of the terminal.

The SRS is used as an example for description. If the power control parameters are configured based on four (that is, K=4) panels (a panel-0 to a panel-3) of the terminal, the power control parameters configured for all SRS resource sets in the manner 3 may be shown by using an example in Table 8.

TABLE 8

| Antenna panel | SRS power control parameter |
|---|---|
| Panel-0 | Parameter 0 |
| Panel-1 | Parameter 1 |
| Panel-2 | Parameter 2 |
| Panel-3 | Parameter 3 |
| Panel-0 and panel-2 | Parameter 0 and parameter 2 (used together with a scaling factor) |
| Panel-1 and panel-3 | Parameter 1 and parameter 3 (used together with a scaling factor) |
| Panel-0, panel-1, panel-2, and panel-3 | Parameter 0 to parameter 3 (used together with a scaling factor) |

It can be learned from Table 8 that for single-panel transmission of the SRS, the manner 3 is the same as the manner 1, and a power control parameter is configured for each panel. However, for multi-panel transmission of the SRS, in the manner 3, no additional power control parameter is configured for multi-panel transmission of the SRS, but a power control parameter used during single-panel transmission is reused. As shown in Table 8, power control parameters used by the panel-0 and the panel-2 to transmit the SRS are the parameter 0 used when only the panel-0 is used to transmit the SRS and the parameter 2 used when only the panel-2 is used to transmit the SRS. In addition, a scaling factor is required. When the panel-0 and the panel-2 are used to transmit the SRS, transmission power of the panel-0 is determined based on the parameter 0 and the scaling factor, and transmission power of the panel-2 is determined based on the parameter 2 and the scaling factor. The scaling factor is used to ensure that a sum of transmission power of a plurality of panels does not exceed the maximum transmission power of the terminal when the plurality of panels are used to transmit the SRS. The plurality of panels may share one scaling factor, or may correspond to different scaling factors. This is not limited in this application.

In the manner 1 to the manner 3, the three manners for configuring the N sets of power control parameters may be combined for implementation, that is, the N sets of power control parameters may be configured for different resources in different manners. For example, the foregoing manner 1 may be used to configure the N sets of power control parameters for an SRS resource set 1, the foregoing manner 2 may be used to configure the N sets of power control parameters for an SRS resource set 2, and the foregoing manner 3 may be used to configure the N sets of power control parameters for an SRS resource set 3. In other words, the power control parameters are not necessarily configured for all SRS resource sets in a same manner. The example is merely used to explain this application and shall not constitute a limitation.

(2) Manner for determining the first power control parameter

1. Determine the first power control parameter based on an implicit indication of the network device.

Specifically, the network device may send spatial relationship information of the M uplink resources/resource sets to the terminal. Correspondingly, the terminal may receive the spatial relationship information sent by the network device. A reference signal indicated by spatial relationship information of an uplink resource/resource set and an uplink signal carried in the uplink resource/resource set have a same spatial characteristic parameter. The reference signal indicated by the spatial relationship information is the source reference signal mentioned in the foregoing introduction content of the spatial relationship information, and may include an SRS, a CSI-RS, or the like.

Optionally, the terminal may determine the first power control parameter based on the spatial relationship information.

Optionally, the terminal may determine the first power control parameter based on the spatial relationship information in the following several implementations:

(1) In a first implementation, the first power control parameter may be determined based on panels used for reference signals indicated by the spatial relationship information of the M uplink resources/resource sets.

Example 1: It is assumed that the N sets of power control parameters configured by the network device for all SRS resource sets are shown in Table 5. It is assumed that a reference signal indicated by spatial relationship information of a specific SRS resource set is a CSI-RS 1, and it is assumed that a panel used by the terminal to receive the CSI-RS 1 or a panel used by the terminal to report a measurement result of the CSI-RS 1 is shown in Table 9.

TABLE 9

| CSI-RS | Antenna panel |
| --- | --- |
| CSI-RS 0 | Panel-0 |
| CSI-RS 1 | Panel-1 |

Optionally, the panel corresponding to the CSI-RS in Table 9 may be a panel used to receive, measure, or report the CSI-RS the last time, a panel having highest channel quality in a time period in which the CSI-RS is received, measured, or reported a plurality of times, or a panel used when average channel quality of the CSI-RS is the highest. Optionally, the panel corresponding to the CSI-RS in Table 9 may alternatively be a panel combination with highest average quality when the terminal uses each panel combination to measure channel quality in a time period.

In the example 1, based on the spatial relationship information of the SRS resource set, it can be learned that an SRS carried in the SRS resource set and the CSI-RS 1 have a same spatial characteristic parameter. Therefore, a panel used for transmitting the SRS on the SRS resource set is the same as the panel used for the CSI-RS 1, and is the panel-1. Because it is determined, through beam training or direct CSI measurement, that transmission quality of transmitting the CSI-RS 1 through the panel-1 is good, transmission quality of transmitting the SRS on the SRS resource set through the panel-1 is also good.

With reference to the N sets of power control parameters shown in Table 5, the terminal may determine, based on the panel-1, that a power control parameter used to transmit the SRS on the SRS resource set is the parameter 1, that is, the first power control parameter is the parameter 1.

Example 2: It is assumed that the N sets of power control parameters configured by the network device for all SRS resource sets are shown in Table 5. It is assumed that a specific SRS resource set includes an SRS resource 0 and an SRS resource 1, and reference signals indicated by spatial relationship information of the SRS resource set include a CSI-RS 0 and a CSI-RS 1, where the CSI-RS 0 corresponds to the SRS resource 0, and the CSI-RS 1 corresponds to the SRS resource 1. In addition, it is assumed that a panel used by the terminal to receive CSI is shown in Table 9.

In the example 2, based on the spatial relationship information of the SRS resource set, it can be learned that an SRS carried in the SRS resource 1 and the CSI-RS 1 have a same spatial characteristic parameter. Therefore, a panel corresponding to the SRS resource 0 is the same as a panel used for the CSI-RS 0, and is the panel-0. Because it is determined, through beam training, that transmission quality of transmitting the CSI-RS 0 through the panel-0 is good, transmission quality of transmitting an SRS on the SRS resource 0 through the panel-0 is also good. Similarly, it can be learned that a panel corresponding to the SRS resource 1 is the same as a panel used for the CSI-RS 1, and is the panel-1. Herein, a panel corresponding to an SRS resource is a panel used to transmit an SRS on the SRS resource.

Figure 7A:
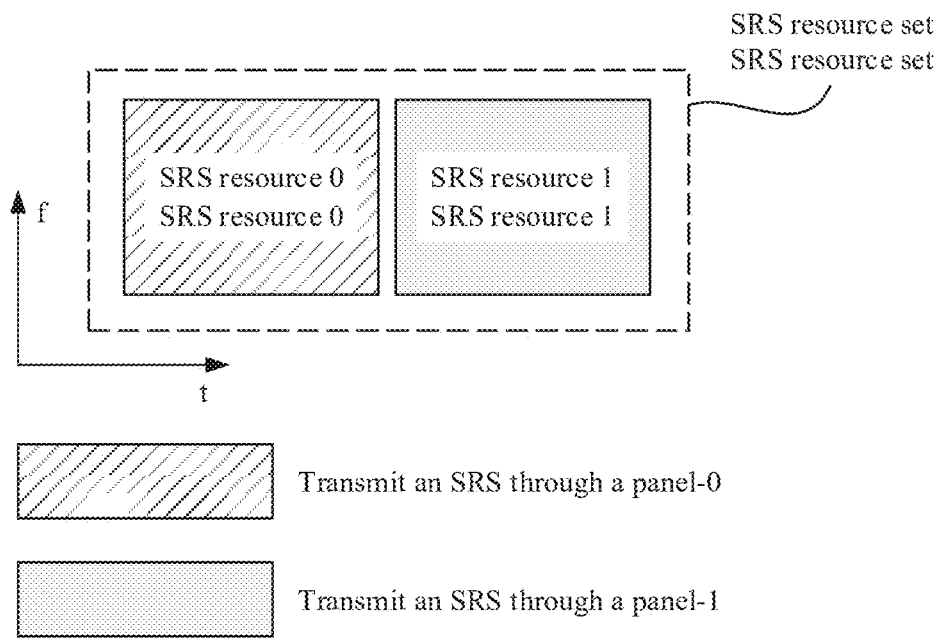
FIG. 7A is an example schematic diagram in which two panels are used for an SRS resource set according to this application.

In the example 2, if the first time unit is one slot, a power control parameter used to transmit an SRS on the SRS resource set may specifically include the following several cases:

As shown in FIG. 7A, if the SRS resource 0 and the SRS resource 1 that are included in the SRS resource set do not overlap in time, transmission of an SRS on the SRS resource set is single-panel transmission of the SRS. Only the panel-0 is first used to transmit the SRS, and then only the panel-1 is used to transmit the SRS. In this case, the terminal may determine, based on Table 5, that a power control parameter used to transmit the SRS on the SRS resource 0 through the panel-0 is the parameter 0. The terminal may also determine that a power control parameter used to transmit the SRS on the SRS resource 1 through the panel-1 is the parameter 1. In other words, the first power control parameter includes the parameter 0 corresponding to the SRS resource 0 and the parameter 1 corresponding to the SRS resource 1.

Figure 7B:
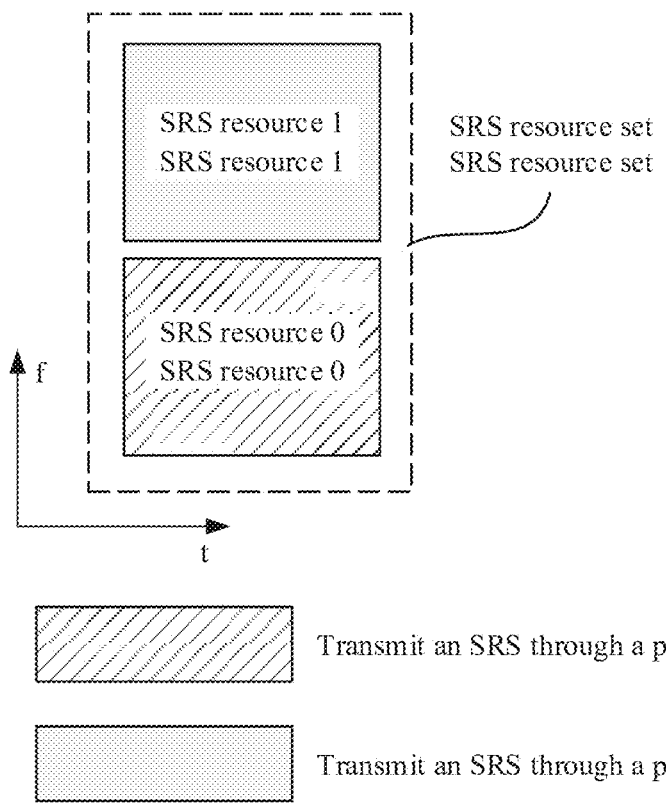
FIG. 7B is an example schematic diagram in which two panels are used for another SRS resource set according to this application.

As shown in FIG. 7B, if the SRS resource 0 and the SRS resource 1 that are included in the SRS resource set completely overlap in time, transmitting an SRS on the SRS resource set is transmitting the SRS through the panel-0 and the panel-1. In this case, the terminal may determine, based on Table 5, that a power control parameter used to transmit the SRS on the SRS resource set is the parameter 2.

Figure 7C:
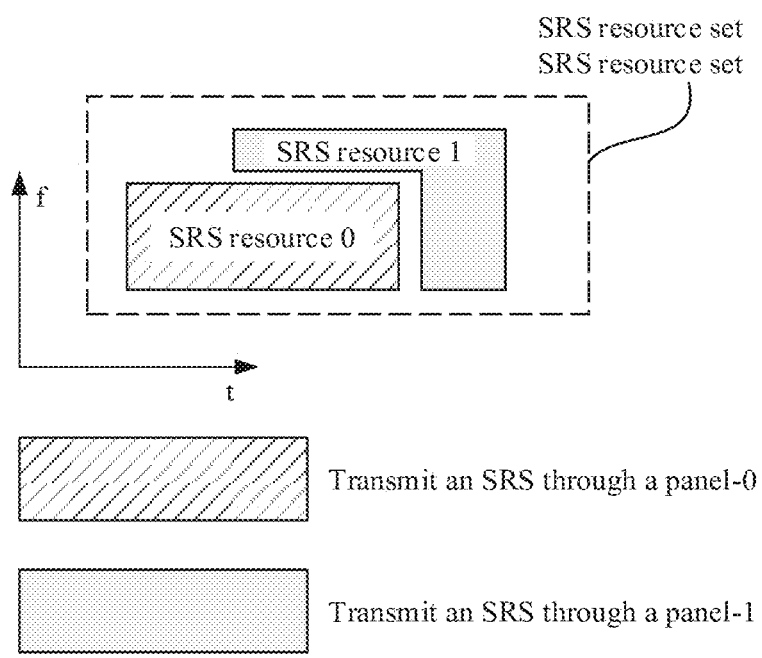
FIG. 7C is an example schematic diagram in which two panels are used for still another SRS resource set according to this application.

As shown in FIG. 7C, if the SRS resource 0 and the SRS resource 1 that are included in the SRS resource set partially overlap in time, transmitting an SRS on the SRS resource set is transmitting the SRS through the panel-0 and the panel-1. In this case, the terminal may determine, based on Table 5, that a power control parameter used to transmit the SRS on the SRS resource set is the parameter 2.

(2) In a second implementation, the first power control parameter may be determined based on a resource, a resource set, or a resource group to which reference signals indicated by the spatial relationship information of the M uplink resources/resource sets belong.

Herein, a resource, a resource set, or a resource group to which a source reference signal belongs is a resource, a resource set, or a resource group carrying the source reference signal.

Optionally, a resource set or resource group division rule may include the following manners:

Manner 1: Reference signals in different resource sets or resource groups may be simultaneously transmitted.

For example, an SRS resource set includes reference signals SRS 1, SRS 2, SRS 3, and SRS 4, and spatial relationship information thereof respective corresponds to an SRS 7, an SRS 8, an SRS 9, and an SRS 10 in uplink beam management (UL beam management). The SRS 7 and the SRS 8 are reference signals belonging to a set 1 (or a group 1) and are transmitted through a panel 1. The SRS 9 and the SRS 10 are reference signals belonging to a set 2 (or a group 2) and are transmitted through a panel 2. A division rule for the set 1 (or the group 1) and the set 2 (or the group 2) is that a reference signal in the set 1 (or the group 1) and a reference signal in the set 2 (or the group 2) can be simultaneously transmitted.

Manner 2: Reference signals in a same resource set or resource group may be simultaneously transmitted.

For example, an SRS resource set includes reference signals SRS 1, SRS 2, SRS 3, and SRS 4, and spatial relationship information thereof respective corresponds to an SRS 7, an SRS 8, an SRS 9, and an SRS 10 in uplink beam management (UL beam management). The SRS 7 is a reference signal belonging to a set 1 (or a group 1) and is transmitted through a panel 1, the SRS 8 is a reference signal belonging to the set 1 (or the group 1) and is transmitted through a panel 2, the SRS 9 is a reference signal belonging to a set 2 (or a group 2) and is transmitted through the panel 1, and the SRS 10 is a reference signal belonging to the set 2 (or the group 2) and is transmitted through the panel 2. A division rule for the set 1 (or the group 1) and the set 2 (or the group 2) is that reference signals in the set 1 (or the group 1) can be simultaneously transmitted, reference signals in the set 2 (or the group 2) can be simultaneously transmitted, and a reference signal in the set 1 (or the group 1) and a reference signal in the set 2 (or the group 2) cannot be simultaneously transmitted.

Optionally, the reference signal (that is, the source reference signal) indicated by the spatial relationship information may be a CSI-RS. In a specific implementation, during downlink transmission of the CSI-RS, the terminal may determine, through beam training on a resource/resource set/resource group for receiving the CSI-RS, one or more panels used for receiving the CSI-RS, and record a mapping between the resource/resource set/resource group corresponding to the CSI-RS and the panel used for the CSI-RS. In this way, after learning of the resource/resource set/resource group to which the source reference signal CSI-RS belongs, the terminal may determine the one or more panels for receiving the CSI-RS, and then determine, from the N sets of power control parameters, a power control parameter corresponding to the panel, that is, the first power control parameter.

For example, before beam training, the network device configures a plurality of reference signal resource sets or reference signal resource groups. For example, a resource set 1 includes {CSI-RS ID 1, CSI-RS ID 2, CSI-RS ID 3, CSI-RS ID 4}, and a resource set 2 includes {CSI-RS ID 5, CSI-RS ID 6, CSI-RS ID 7, CSI-RS ID 8}. The resource set 1 is used for receive beam training of the panel 1, and the resource set 2 is used for receive beam training of the panel 2. In this way, the terminal may determine a panel for receiving any one or some CSI-RSs in the CSI-RS ID 1 to the CSI-RS ID 8, to determine the first power control parameter.

Because a spatial characteristic parameter of the source reference signal CSI-RS is the same as a spatial characteristic parameter of an uplink signal, a panel used to transmit the uplink signal is the same as the panel used to receive the source reference signal CSI-RS.

Optionally, the reference signal (that is, the source reference signal) indicated by the spatial relationship information may be an SRS. During uplink transmission of the SRS, the terminal may record a mapping between a resource/resource set/resource group corresponding to the source reference signal SRS and one or more panels used for the SRS. In this way, after learning of the resource/resource set/resource group to which the source reference signal SRS belongs, the terminal may determine one or more panels for transmitting the source reference signal SRS, and then determine, from the N sets of power control parameters, a power control parameter corresponding to the panel, that is, the first power control parameter.

For example, before beam training, the network device configures a plurality of reference signal resource sets or reference signal resource groups. For example, a resource set 1 includes {SRS ID 1, SRS ID 2, SRS ID 3, SRS ID 4}, and a resource set 2 includes {SRS ID 5, SRS ID 6, SRS ID 7, SRS ID 8}. The resource set 1 is used for transmit beam training of the panel 1, and the resource set 2 is used for transmit beam training of the panel 2. In this way, the terminal may determine a panel for transmitting any one or some SRSs in the SRS ID 1 to the SRS ID 8, to determine the first power control parameter.

Because a spatial characteristic parameter of the source reference signal SRS is the same as a spatial characteristic parameter of an uplink signal, a panel used to transmit the uplink signal is the same as the panel used to transmit the source reference signal SRS.

In this application, indicating a panel may be equivalent to indicating a resource set or a resource group.

Optionally, for the uplink signal, there may be one or more pieces of spatial relationship information (during multi-panel transmission). Each piece of spatial relationship information may include one reference signal index. Optionally, there may be only one piece of spatial relationship information for the uplink signal, and each piece of spatial relationship information may include one or more reference signals (during multi-panel transmission).

(3) In a third implementation, the first power control parameter may be determined based on a quantity of reference signals indicated by the spatial relationship information of the M uplink resources/resource sets.

Specifically, the third implementation is applicable to the foregoing manner 2 for configuring the N sets of power control parameters. If one reference signal corresponds to one panel, the terminal may determine a quantity of panels based on the quantity of reference signals indicated by the spatial relationship information, so as to determine a transmission mode. If the quantity of panels is equal to 1, the terminal may determine that the first power control parameter is a power control parameter used for single-panel transmission of an SRS. If the quantity of panels is greater than or equal to 2, the terminal may determine that the first power control parameter is a power control parameter used for multi-panel transmission of an SRS.

For example, in a non-codebook transmission scenario, one CSI-RS corresponds to one panel. It is assumed that the power control parameters configured for the M uplink resources/resource sets are shown in the foregoing Table 6. In this case, when a quantity of CSI-RSs is equal to 1, the first power control parameter is the parameter 0. When a quantity of CSI-RSs is equal to 2, the first power control parameter is the parameter 1.

The foregoing three implementations described in (1) to (3) constitute no limitation. The terminal may alternatively determine the first power control parameter based on the spatial relationship information in another implementation. For example, if one resource set/resource corresponds to one panel, and one resource set/resource corresponds to one piece of spatial relationship information, in the foregoing manner 2 for configuring the N sets of power control parameters, the terminal may alternatively determine the first power control parameter based on a quantity of pieces of spatial relationship information. Optionally, the spatial relationship may be an active spatial relationship.

The spatial relationship information mentioned in this application extends a higher-layer parameter (for example, pucch-SpatialRelationInfo) defined in an existing protocol and describing spatial relationship information. A reference signal (for example, an SRS or a CSI-RS) indicated by the higher-layer parameter constitutes no limitation. The reference signal indicated by the spatial relationship information in this application may further include a reference signal (for example, a CSI-RS) associated with an uplink resource/resource set used for non-codebook transmission (for example, an SRS resource set in non-codebook usage). Herein, the reference signal associated with the uplink resource/resource set used for non-codebook transmission is a reference signal having a QCL relationship or a spatial relationship with an uplink signal carried in the uplink resource/resource set used for non-codebook transmission.

In this application, the spatial relationship information may be referred to as first indication information.

2. Determine the first power control parameter based on an explicit indication of the network device.

Specifically, the network device may send one or more of the following indication information to the terminal: antenna panel switch indication information, antenna panel identifier information (panel ID), or indication information of the uplink signal transmission mode. Correspondingly, the terminal may receive the indication information sent by the network device. The uplink signal transmission mode may include single-panel transmission of an uplink signal and multi-panel transmission of an uplink signal. The information directly indicates a panel or a quantity of panels that should be used by the terminal to transmit the uplink signal on the M uplink resources/resource sets. The terminal may determine, based on one or more items in the information, the first power control parameter that needs to be used to transmit the uplink signal. In other words, the terminal may determine, based on the explicit indication of the network device, which set or sets of power control parameters are to be used.

The antenna panel switch indication information may indicate which panels are to be enabled, or which panels are to be disabled. If the switch indication information indicates which panels are to be disabled, enabled panels are terminal panels other than the disabled panels. The first power control parameter is a power control parameter corresponding to an enabled panel in the N sets of power control parameters. In a specific implementation, the antenna panel switch indication information may have a plurality of bits. One bit corresponds to one panel and indicates enabling or disabling of the panel. In actual application, the switch indication information may be alternatively implemented in another manner. This is not limited in this application.

A panel indicated by the antenna panel identifier information (panel ID) is a panel that should be used by the terminal to transmit the uplink signal on the M uplink resources/resource sets. The first power control parameter is a power control parameter corresponding to the panel indicated by the identifier information in the N sets of power control parameters.

An implementation of determining the first power control parameter based on the indication information of the uplink signal transmission mode is applicable to the foregoing manner 2 for configuring the N sets of power control parameters. The first power control parameter is a set of power control parameters corresponding to the uplink signal transmission mode.

In this application, one or more of the antenna panel switch indication information, the antenna panel identifier information (panel ID), or the indication information of the uplink signal transmission mode may be referred to as second indication information.

The foregoing content describes the manner in which the terminal determines the first power control parameter based on the implicit indication or the explicit indication of the network device. This is not limited. The first power control parameter may be predefined in a protocol, may be determined based on information (such as a channel quality measurement report or information about a panel with good channel quality) previously reported by the terminal, or may be determined based on a measurement result on a terminal side.

Figure 8:
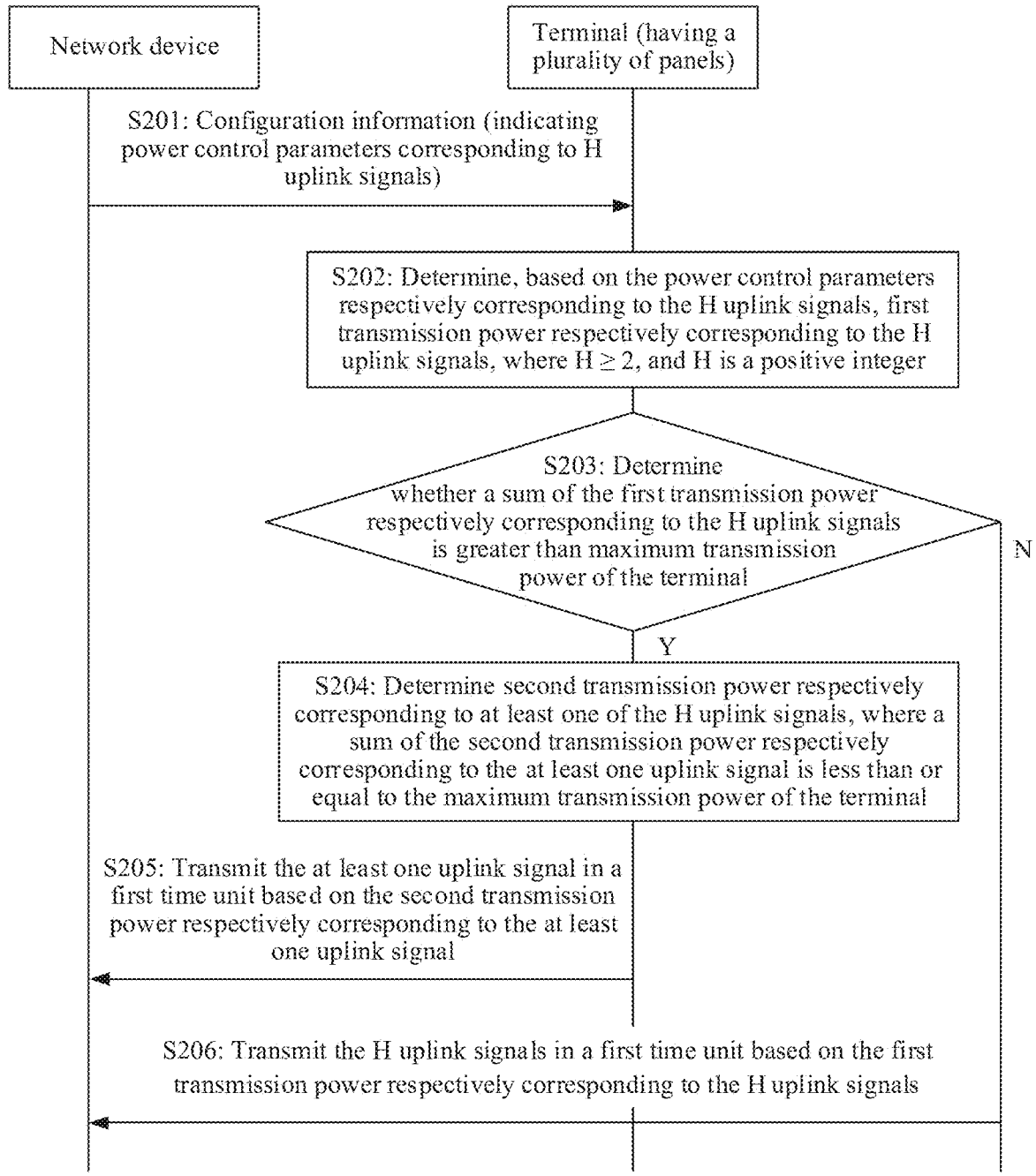
FIG. 8 is an overall example schematic flowchart of another signal transmission method according to this application.

The following describes the solution 2 in detail. The solution 2 mainly discusses how to allocate transmission power to uplink signals corresponding to a plurality of panels in a scenario in which the uplink signals are transmitted through the plurality of panels. FIG. 8 is an overall flowchart of a signal transmission method described in the solution 2. The method may include the following steps.

S201: A network device may send configuration information to a terminal, where the configuration information indicates power control parameters configured for H uplink signals. H≥2, and H is a positive integer. The H uplink signals are respectively transmitted through H panels of the terminal. The H uplink signals are carried in a first time unit. For descriptions of the first time unit, refer to the foregoing content.

S202: The terminal may determine, based on the power control parameters respectively corresponding to the H uplink signals, first transmission power respectively corresponding to the
H uplink signals.

A manner for determining the first transmission power respectively corresponding to the uplink signals is described in detail in the following content.

S203: The terminal determines whether a sum of the first transmission power respectively corresponding to the H uplink signals is greater than maximum transmission power of the terminal, and performs S204 and S205 if the sum of the first transmission power respectively corresponding to the H uplink signals is greater than the maximum transmission power of the terminal, or performs S206 if the sum of the first transmission power respectively corresponding to the H uplink signals is not greater than the maximum transmission power of the terminal.

S204: If the sum of the first transmission power respectively corresponding to the H uplink signals is greater than the maximum transmission power of the terminal, the terminal determines second transmission power respectively corresponding to at least one of the H uplink signals. A sum of the second transmission power respectively corresponding to the at least one uplink signal is less than or equal to the maximum transmission power of the terminal.

S205: The terminal may transmit the at least one uplink signal in the first time unit based on the second transmission power respectively corresponding to the at least one uplink signal.

Correspondingly, the network device receives the at least one uplink signal in the first time unit. The sum of the second transmission power respectively corresponding to the at least one uplink signal is less than or equal to the maximum transmission power of the terminal, and the second transmission power respectively corresponding to the at least one uplink signal is determined based on channel quality information of reference signals respectively related to the H uplink signals.

Herein, the related reference signals may include one or more of the following: reference signals included in or indicated by spatial relationship information of the H uplink signals, and reference signals that are included in the power control parameters respectively corresponding to the H uplink signals and that are used for path loss estimation. The channel quality information of the related reference signals is previously reported by the terminal. Optionally, the channel quality information of the related reference signals may be reported by the terminal the last time. The channel quality information includes reference signal received power RSRP, a CQI, RSRQ, an SINR, an SNR, or the like.

For example, the related reference signals may be downlink reference signals included in the power control parameters, and before sending the H signals, the terminal reports reception power of the downlink reference signals respectively related to the H uplink signals. A base station knows transmission power of the downlink reference signals. Therefore, the network device may estimate downlink path losses of the downlink reference signals. The related reference signals may be reference signals included in the spatial relationship information. The terminal may perform channel measurement before, and report a channel measurement result to the base station.

In this way, the network device can determine, based on quality that is of the related reference signals and that is previously reported by the terminal, which signal has a better transmission path, and then determine which signal is sent based on power indicated by the network device and which signal is sent based on remaining power.

S206: If the sum of the first transmission power respectively corresponding to the H uplink signals 1 is less than or equal to the maximum transmission power of the terminal, the terminal may transmit the H uplink signals in the first time unit based on the first transmission power respectively corresponding to the H uplink signals.

Optionally, the configuration information may specifically indicate power control parameters configured for M uplink resources/resource sets. The power control parameters configured for the M uplink resources/resource sets may include the power control parameters configured for the H uplink signals. A plurality of sets of power control parameters may be configured for the M uplink resources/resource sets (refer to the solution 1), or only one set of power control parameters may be configured for the M uplink resources/resource sets.

It can be learned that in the solution 2, the following problem is considered: in a scenario in which an uplink signal is transmitted through a plurality of panels, a sum of transmission power (that is, first transmission power) respectively determined for the plurality of panels based on power control parameters may exceed the maximum transmission power of the terminal. In this case, the terminal may allocate, based on path losses respectively related to the H panels, transmission power to the uplink signals corresponding to the H panels. Specifically, transmission power is preferentially allocated to an uplink signal corresponding to a panel with a lower path loss. In a possible case, no transmission power is allocated to some of the H panels, or no signal is transmitted through the some panels.

The following describes aspects (1) and (2) in the solution 2 in detail.

(1) How to allocate transmission power to an uplink signal corresponding to each panel.

1. Scenario 1: a scenario in which a plurality of sets of power control parameters are configured for the M uplink resources/resource sets (for configuration of the plurality of sets of power control parameters, refer to the solution 1).

(1) How to determine the first transmission power respectively corresponding to the H uplink signals is first described.

Specifically, referring to the foregoing solution 1, it can be learned that the terminal may determine, based on an implicit indication (that is, spatial relationship information) or an explicit indication (that is, panel switch indication information, a panel ID, or the like) of the network device, the power control parameters used by the terminal to transmit the H uplink signals, namely, the first power control parameter mentioned in the foregoing solution 1. Then, the terminal may determine, based on the first power control parameter, the first transmission power respectively corresponding to the H uplink signals.

Example 1: An SRS is used as an example for description. It is assumed that a plurality of sets of power control parameters configured for all SRS resource sets are shown by using an example in Table 10.

TABLE 10

| Antenna panel | SRS power control parameter |
| --- | --- |
| Panel-0 | Parameter 0 |
| Panel-1 | Parameter 1 |
| Panel-2 | Parameter 2 |
| Panel-3 | Parameter 3 |
| Panel-0 and panel-2 | Parameter 4 |
| Panel-1 and panel-3 | Parameter 5 |
| Panel-0, panel-1, panel-2, and panel-3 | Parameter 6 |

It is also assumed that reference signals indicated by spatial relationship information of a specific SRS resource set include a CSI-RS 0 and a CSI-RS 2. In addition, it is assumed that the terminal receives the CSI-RS 0 through the panel-0, and receives the CSI-RS 2 through the panel-2. In this case, the H uplink signals are an SRS transmitted through the panel-0 and an SRS transmitted through the panel-2. It may be determined, according to Table 10, that power control parameters corresponding to the H SRSs are the parameter 4.

In a possible implementation, the parameter 4 may be two sets of power control parameters, which are configured for use when the panel-0 and the panel-2 are used to transmit the SRSs. In this case, first transmission power $P'_{panel\text{-}0}$ corresponding to the SRS transmitted through the panel-0 is determined based on one set of power control parameters ($p0_1$, $alpha_1$, $RS_1$) and first transmission power $P'_{panel\text{-}2}$ corresponding to the SRS transmitted through the panel-2 is determined based on the other set of power control parameters ($p0_2$, $alpha_2$, $RS_2$). $RS_1$ and $RS_2$ are path loss reference signals. In this case, $P'_{panel\text{-}0}=p0_1+alpha_1\times PL(RS_1)$, and $P'_{panel\text{-}2}=p0_2+alpha_2\times PL(RS_2)$. $PL(RS_1)$ is a path loss calculated based on $RS_1$, and $PL(RS_2)$ is a path loss calculated based on $RS_2$.

In another possible implementation, the parameter 4 may alternatively be one set of power control parameters, which are configured for use when the panel-0 and the panel-2 are used to transmit the SRSs. In this case, both first transmission power $P'_{panel-0}$ corresponding to the SRS transmitted through the panel-0 and first transmission power $P'_{panel-2}$ corresponding to the SRS transmitted through the panel-2 are determined based on the set of power control parameters (p0, alpha, $RS_{PL}$). In this case, $P'_{panel-0}=p0+alpha\times PL(CSI-RS0)$, and $P'_{panel-2}=p0+alpha\times PL(CSI-RS 2)$. PL(CSI-RS 0) is a path loss calculated based on CSI-RS 0, and PL(CSI-RS 2) is a path loss calculated based on CSI-RS 2. The path loss reference signal $RS_{PL}$ in the set of power control parameters (p0, alpha, $RS_{PL}$) does not consider channel statuses of a plurality of transmission paths corresponding to a plurality of panels, and is not applicable to calculation of path losses respectively related to the SRS transmitted through the panel-0 and the SRS transmitted through the panel-2. Therefore, the terminal may perform re-measurement based on the source reference signals CSI-RS 0 and CSI-RS 2 respectively corresponding to the SRS transmitted through the panel-0 and the SRS transmitted through the panel-2, to obtain the path losses respectively related to the SRS transmitted through the panel-0 and the SRS transmitted through the panel-2.

Example 2: An SRS is used as an example for description. It is assumed that a plurality of sets of power control parameters configured for all SRS resource sets are shown by using an example in Table 11.

TABLE 11

| Antenna panel | SRS power control parameter |
| --- | --- |
| Panel-0 | Parameter 0 |
| Panel-1 | |
| Panel-2 | |

| Antenna panel | SRS power control parameter |
| --- | --- |
| Panel-3 | |
| Panel-0 and panel-2 | Parameter 1 |
| Panel-1 and panel-3 | |
| Panel-0, panel-1, panel-2, and panel-3 | |

Herein, details are as follows:

The parameter 0 is one set of power control parameters, and is configured for single-panel transmission of the SRS.

The parameter 1 is one set of power control parameters, and is configured for multi-panel transmission of the SRS. In this case, transmission power control of each panel complies with the set of power control parameters.

It is also assumed that reference signals indicated by spatial relationship information of a specific SRS resource set include a CSI-RS 1 and a CSI-RS 3. In addition, it is assumed that the terminal receives the CSI-RS 1 through the panel-1, and receives the CSI-RS 3 through the panel-3. In this case, the H uplink signals are an SRS transmitted through the panel-1 and an SRS transmitted through the panel-3. It may be determined, according to Table 11, that power control parameters corresponding to the H panels are the parameter 1.

In this case, both first transmission power $P'_{panel-1}$ corresponding to the SRS transmitted through the panel-1 and first transmission power $P'_{panel-3}$ corresponding to the SRS transmitted through the panel-3 are determined based on the parameter 1 (p0, alpha, $RS_{PL}$). In this case, $P'_{panel-1}=p0+alpha\times PL(CSI-RS 1)$, and $P'_{panel-3}=p0+alpha\times PL(CSI-RS 3)$. PL(CSI-RS 1) is a path loss calculated based on CSI-RS 1, and PL(CSI-RS 3) is a path loss calculated based on CSI-RS 3. The path loss reference signal $RS_{PL}$ in the set of power control parameters (p0, alpha, $RS_{PL}$) does not consider channel statuses of a plurality of transmission paths corresponding to a plurality of panels, and is not applicable to calculation of path losses respectively related to the SRS transmitted through the panel-1 and the SRS transmitted through the panel-3. Therefore, the terminal may perform re-measurement based on the source reference signals CSI-RS 1 and CSI-RS 3 respectively corresponding to the SRS transmitted through the panel-1 and the SRS transmitted through the panel-3, to obtain the path losses respectively related to the SRS transmitted through the panel-1 and the SRS transmitted through the panel-3.

(2) Then, how to determine second transmission power for the H uplink signals is described.

When the sum of the first transmission power respectively determined for the H uplink signals based on the power control parameters exceeds the maximum transmission power of the terminal, the terminal may preferentially allocate, based on the path losses related to the uplink signals, transmission power to an uplink signal corresponding to an uplink signal with a lower path loss. In other words, power is allocated to an uplink signal with a lower path loss in preference to an uplink signal with a higher path loss.

Two uplink signals (an uplink signal transmitted through the panel-1 and an uplink signal transmitted through the panel-2) are used as an example, and it is assumed that $P'_{panel-1}+P'_{panel-2}>Pmax$, and $PL(panel-1)<PL(panel-2)$. Herein, $P'_{panel-1}$ represents first transmission power corresponding to the uplink signal transmitted through the panel-1, $P'_{panel-2}$ represents first transmission power corresponding to the uplink signal transmitted through the panel-2, Pmax represents the maximum transmission power of the terminal, PL(panel-1) represents a path loss related to the uplink signal transmitted through the panel-1, and PL(panel-2) represents a path loss related to the uplink signal transmitted through the panel-3.

If $P'_{panel-1}<P_{max}, P_{panel-1}=P'_{panel-1}$, and $P_{panel-2}=Pmax-P_{panel-1}$.

If $P'_{panel-1}>Pmax, P'_{panel-1}=Pmax$, and $P'_{panel-2}=0$.

Herein, $P_{panel-1}$ represents second transmission power corresponding to the uplink signal transmitted through the panel-1, and $P_{panel-2}$ represents second transmission power corresponding to the uplink signal transmitted through the panel-2.

It can be learned from this example that transmission power is preferentially allocated to an uplink signal with a lower path loss. In a possible case, no transmission power is allocated to uplink signals transmitted through some of the H panels. For example, the second transmission power corresponding to the uplink signal transmitted through the panel-2 may be 0.

The foregoing example is merely used to explain this application. Actually, transmission power may be allocated to uplink signals transmitted through more panels (H>2).

In summary, the terminal may perform at least one round of power allocation in ascending order of the path losses related to the uplink signals.

In an $i^{th}$ (i is a positive integer, and i is less than or equal to H) round of power allocation, an uplink signal with a lowest current path loss is determined from uplink signals for which no second transmission power is determined, and may be represented as $S_{i-minPL}$. Actual transmission power allocated to $S_{i-minPL}$ may be min$\{P'_i, Pmax\}$. Herein, the actual transmission power of $S_{i-minPL}$ is second transmission power corresponding to $S_{i-minPL}$, Pmax represents the maximum transmission power of the terminal, and min represents selecting a minimum value. $P_{i-r}$ remaining transmission power obtained after transmission power allocated in previous i−1 rounds is subtracted from the maximum transmission power of the terminal. $P'_i$ represents first transmission power corresponding to $S_{i\text{-}minPL}$.

Specifically, the $i^{th}$ round of power allocation may be expressed according to the following algorithm:

$$P_i = \min\{P_r, P'_i\}.$$

Herein, when i=1, Pr=Pmax, or when i>1, Pr=Pmax−$P_{i-1}$− . . . −$P_1$.

Herein, $P_i$ represents the second transmission power corresponding to $S_{i\text{-}minPL}$, $P'_i$ represents the first transmission power corresponding to $S_{i\text{-}minpL}$, Pmax represents the maximum transmission power of the terminal, Pr represents the remaining transmission power obtained after the transmission power allocated in the previous i−1 rounds of power allocation is subtracted from the maximum transmission power of the terminal, 0≤Pr≤Pmax, and $S_{i\text{-}minPL}$ corresponds to an antenna panel that has a lowest path loss and for which no second transmission power is determined in the $i^{th}$ round of power allocation.

In the solution 2, a path loss related to an uplink signal transmitted through each panel may be obtained through calculation based on a reference signal that corresponds to the uplink signal transmitted through each panel and that is used for path loss estimation.

In an implementation, a reference signal that corresponds to an uplink signal transmitted through a panel and that is used for path loss estimation may be a reference signal indicated by spatial relationship information of the uplink signal.

For example, reference signals indicated by spatial relationship information of a specific SRS resource set include a CSI-RS 0 and a CSI-RS 2. In addition, it is assumed that the terminal receives the CSI-RS 0 through the panel-0, and receives the CSI-RS 2 through the panel-2. In this case, the CSI-RS 0 is a path loss reference signal related to an SRS transmitted through the panel-0, and the CSI-RS 2 is a path loss reference signal related to an SRS transmitted through the panel-2. The example is merely used to explain this application and shall not constitute a limitation.

In another implementation, a reference signal that corresponds to a panel and that is used for path loss estimation may be a path loss reference signal included in a power control parameter corresponding to an uplink signal transmitted through the panel.

For example, it is assumed that first transmission power $P'_{panel\text{-}2}$ corresponding to an uplink signal transmitted through the panel-2 is determined based on power control parameters (p$0_2$, alpha$_2$, RS$_2$). In this case, a path loss reference signal related to the uplink signal transmitted through the panel-2 may be RS$_2$. The example is merely used to explain this application and shall not constitute a limitation.

2. Scenario 2: a scenario in which only one set of power control parameters is configured for the M uplink resources/resource sets.

In the scenario in which only one set of power control parameters is configured for the M uplink resources/resource sets, the terminal may determine, based on the set of power control parameters, first transmission power corresponding to an uplink signal transmitted by each of the H panels. However, it needs to be considered that path losses respectively corresponding to the panels are different.

(1) How to determine the first transmission power respectively corresponding to the H uplink signals is first described.

Specifically, the first transmission power corresponding to the uplink signal transmitted through each of the H antenna panels may be determined based on the following parameters included in the set of power control parameters: target reception power p0 of the uplink signal, a path loss compensation factor alpha, and a path loss obtained through measurement based on a reference signal indicated by spatial relationship information of the uplink signal transmitted through each of the H panels.

For example, it is assumed that only one set of power control parameters (p0, alpha, RS$_{PL}$) is configured for the M uplink resources/resource sets. In addition, it is assumed that reference signals indicated by spatial relationship information of a specific SRS resource set include a CSI-RS 0 and a CSI-RS 2, and the terminal receives the CSI-RS 0 through the panel-0, and receives the CSI-RS 2 through the panel-2.

First transmission power corresponding to an uplink signal transmitted through the panel-0 may be determined based on the following parameters: p0, alpha, and a path loss obtained through measurement based on CSI-RS 0. In other words, the first transmission power=p0+alpha×PL(CSI-RS 0).

First transmission power corresponding to an uplink signal transmitted through the panel-2 may be determined based on the following parameters: p0, alpha, and a path loss obtained through measurement based on CSI-RS 2. In other words, the first transmission power=p0+alpha×PL(CSI-RS 2).

The path loss reference signal RS$_{PL}$ in the only one set of configured power control parameters (p0, alpha, RS$_{PL}$) does not consider that path losses respectively related to a plurality of panels are different, and is not applicable to calculation of path losses related to the uplink signal transmitted through the panel-0 and the uplink signal transmitted through the panel-2. Therefore, the terminal may perform re-measurement based on the source reference signals CSI-RS 0 and CSI-RS 2 respectively corresponding to the uplink signal transmitted through the panel-0 and the uplink signal transmitted through the panel-2, to obtain the path losses respectively related to the uplink signal transmitted through the panel-0 and the uplink signal transmitted through the panel-2, and determine, based on the re-calculated path losses, first transmission power corresponding to the uplink signals respectively transmitted through the panels.

(2) Then, how to determine second transmission power for the H uplink signals is described.

Specifically, a manner for determining the second transmission power for the H uplink signals is the same as the manner for determining the second transmission power corresponding to the at least one of the H uplink signals in the scenario 1. For details, refer to related content in the foregoing scenario 1.

(2) How to determine a quantity of panels for transmitting an uplink signal on the M uplink resources/resource sets.

Optionally, the terminal may determine, based on the spatial relationship information, the quantity of panels used to transmit the uplink signal on the M uplink resources/resource sets. If the quantity of panels is greater than or equal to 2, the terminal determines that a transmission mode of the uplink signal is multi-panel transmission of the uplink signal. The quantity of panels is equal to a quantity of uplink signals. It may be understood that the foregoing H uplink signals are transmitted through the H panels in a multi-panel transmission mode.

Optionally, the quantity of panels may be determined based on one or more of the following: a quantity of pieces of spatial relationship information of the M uplink resources/resource sets, a quantity of reference signals indicated by the spatial relationship information, and a resource, a resource set, or a resource group to which the reference signals (for example, an SRS used for beam training) indicated by the spatial relationship information belong. Descriptions are separately provided below.

1. Determine the quantity of panels based on the quantity of pieces of spatial relationship information.

Optionally, if one resource set/resource corresponds to one panel, and one resource set/resource corresponds to one piece of spatial relationship information, the terminal may determine the quantity of panels based on the quantity of pieces of spatial relationship information.

2. Determine the quantity of panels based on the quantity of reference signals indicated by the spatial relationship information.

Optionally, if one reference signal corresponds to one panel, the terminal may determine the quantity of panels based on the quantity of reference signals indicated by the spatial relationship information. For example, in a non-codebook transmission scenario, one CSI-RS corresponds to one panel. Therefore, the terminal can determine the quantity of panels based on a quantity of reference signals CSI-RSs indicated by the spatial relationship information.

3. Determine the quantity of panels based on a quantity of resources, resource sets, or resource groups to which the reference signals (that is, source reference signals) indicated by the spatial relationship information belong.

Herein, a resource, a resource set, or a resource group to which a source reference signal belongs is a resource, a resource set, or a resource group carrying the source reference signal.

Optionally, the reference signal (that is, the source reference signal) indicated by the spatial relationship information may be a CSI-RS. During downlink transmission of the CSI-RS, the terminal may determine, through beam training on a resource/resource set/resource group for receiving the CSI-RS, a panel used for receiving the CSI-RS, and record a mapping between the resource/resource set/resource group corresponding to the CSI-RS and the panel used for the CSI-RS. In this way, after learning of the resource/resource set/resource group to which the source reference signal CSI-RS belongs, the terminal may determine one or more panels for receiving the CSI-RS. Because a spatial characteristic parameter of the source reference signal CSI-RS is the same as a spatial characteristic parameter of an uplink signal, a panel used to transmit the uplink signal is the same as the panel used to receive the source reference signal CSI-RS. In this way, a quantity of panels used for transmitting the uplink signal can be determined.

Optionally, the reference signal (that is, the source reference signal) indicated by the spatial relationship information may be an SRS. During uplink transmission of the SRS, the terminal may determine, through beam training on a resource/resource set/resource group for transmitting the SRS, a panel used for transmitting the source reference signal SRS, and record a mapping between the resource/resource set/resource group corresponding to the source reference signal SRS and the panel used for the source reference signal SRS. In this way, after learning of the resource/resource set/resource group to which the source reference signal SRS belongs, the terminal may determine one or more panels for transmitting the source reference signal SRS. Because a spatial characteristic parameter of the source reference signal SRS is the same as a spatial characteristic parameter of an uplink signal, a panel used to transmit the uplink signal is the same as the panel used to transmit the source reference signal SRS. In this way, a quantity of panels used for transmitting the uplink signal can be determined.

The quantity of panels is not limited to being determined based on the spatial relationship information. Optionally, the terminal may alternatively determine the quantity of panels based on other indication information sent by the network device, for example, panel switch indication information, a panel ID, or indication information of the uplink signal transmission mode.

For example, if the panel switch indication information indicates that the panel-0 and the panel-2 are to be enabled, the terminal may determine that the quantity of panels is 2. For another example, if the panel ID indicates the panel-0 to the panel-2, the terminal may determine that the quantity of panels is 3. For still another example, if the indication information of the uplink signal transmission mode indicates four-panel transmission of the uplink signal, the terminal may determine that the quantity of panels is 4. The examples are merely used to explain this application and shall not constitute a limitation.

Figure 9:
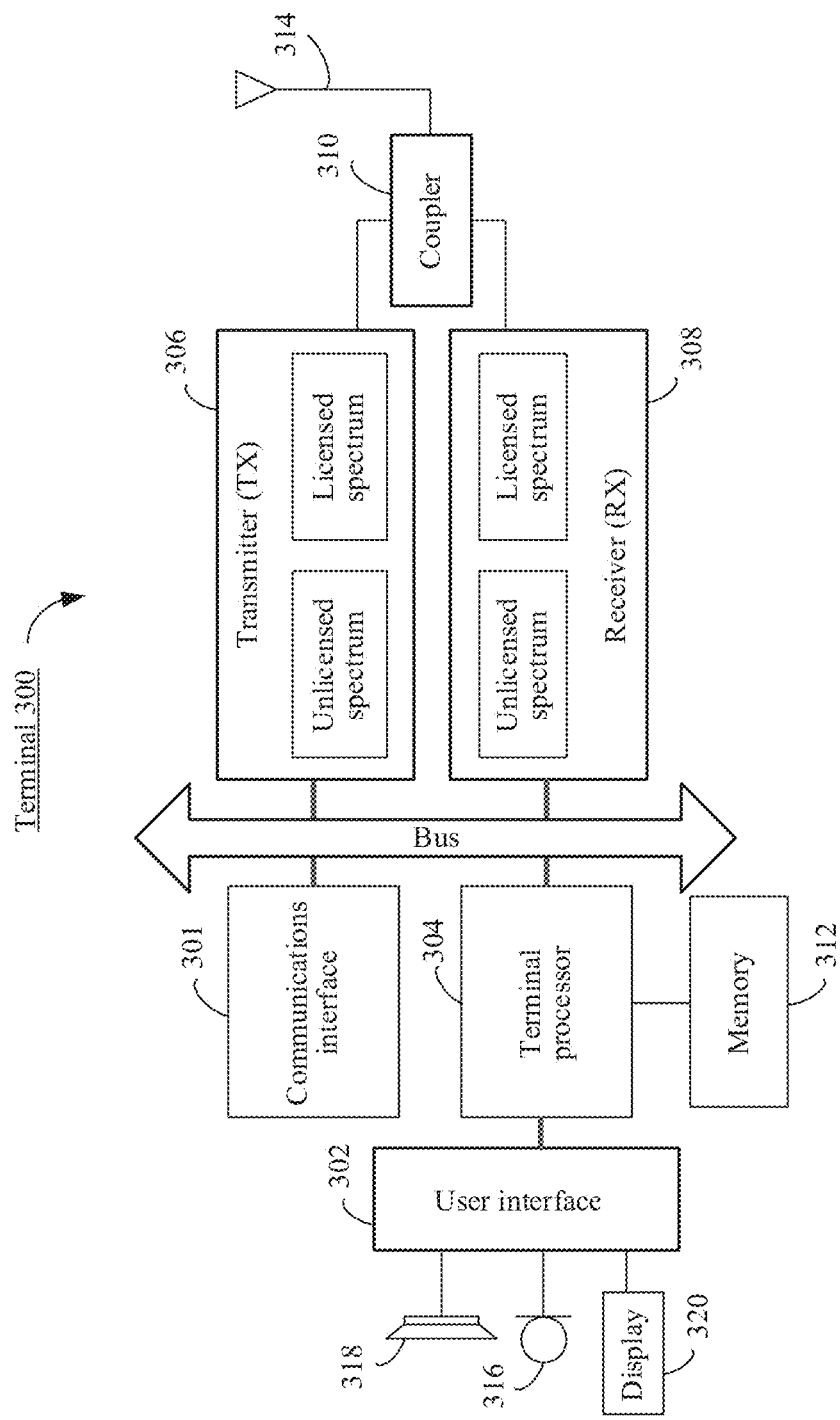
FIG. 9 is an example schematic diagram of a hardware architecture of a terminal device according to an embodiment of this application.

FIG. 9 shows a terminal 300 according to some embodiments of this application. As shown in FIG. 9, the terminal 300 may include input/output modules (including an audio input/output module 318, a key input module 316, a display 320, and the like), a user interface 302, one or more terminal processors 304, a transmitter 306, a receiver 308, a coupler 310, an antenna 314, and a memory 312. These components may be connected through a bus 504 or in another manner. In FIG. 9, an example in which the components are connected through the bus is used.

A communications interface 301 may be used by the terminal 300 to communicate with another communications device, for example, a base station. Specifically, the base station may be a network device 400 shown in FIG. 10. The communications interface 301 is an interface between the terminal processor 304 and a transceiver system (including the transmitter 306 and the receiver 308), for example, an X1 interface in LTE. In a specific implementation, the communications interface 301 may include one or more of a global system for mobile communications (GSM) (2G) communications interface, a wideband code division multiple access (WCDMA) (3G) communications interface, a long term evolution (LTE) (4G) communications interface, and the like, or may be a 4.5G, 5G, or future new radio communications interface. In addition to a wireless communications interface, a wired communications interface 301, for example, a local area network (LAN) interface may further be configured on the terminal 300.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communication signal received by the antenna 314 into a plurality of signals, and allocate the signals to a plurality of receivers 308.

The transmitter 306 may be configured to perform transmission processing on a signal output by the terminal processor 304, for example, modulate the signal in a licensed frequency band or an unlicensed frequency band.

The receiver 308 may be configured to perform receiving processing on a mobile communication signal received by the antenna 314. For example, the receiver 308 may demodulate a received signal that has been modulated in an unlicensed frequency band or a licensed frequency band.

In some embodiments of this application, the transmitter 306 and the receiver 308 may be considered as a wireless modem. In the terminal 300, there may be one or more transmitters 306 and one or more receivers 308.

In addition to the transmitter 306 and the receiver 308 shown in FIG. 9, the terminal 300 may further include another communications component, for example, a GPS module, a Bluetooth module, or a wireless fidelity (Wi-Fi) module. In addition to the wireless communication signal, the terminal 300 may further support another wireless communication signal, for example, a satellite signal or a short-wave signal. In addition to wireless communication, the terminal 300 may be further equipped with a wired network interface (for example, a LAN interface) to support wired communication.

The input/output modules may be configured to implement interaction between the terminal 300 and a user/an external environment, and may mainly include the audio input/output module 318, the key input module 316, the display 320, and the like. In a specific implementation, the input/output modules may further include a camera, a touchscreen, a sensor, and the like. The input/output modules all communicate with the terminal processor 304 through the user interface 302.

The memory 312 is coupled to the terminal processor 304, and configured to store various software programs and/or a plurality of sets of instructions. In a specific implementation, the memory 312 may include a high-speed random access memory, and may also include a nonvolatile memory, such as one or more disk storage devices, a flash memory device, or another nonvolatile solid-state storage device. The memory 312 may store an operating system (briefly referred to as a system below), for example, an embedded operating system such as Android®, iOS®, Windows®, or Linux®. The memory 312 may further store a network communications program. The network communications program may be used to communicate with one or more additional devices, terminal devices, and network devices. The memory 312 may further store a user interface program. The user interface program may use a graphical operation interface to visually display content of an application program, and use input controls such as menus, dialog boxes, and keys to receive control operations of a user on an application program.

In some embodiments of this application, the memory 312 may be configured to store an implementation program, on a terminal 300 side, of a signal transmission method provided in one or more embodiments of this application. For an implementation of the signal transmission method provided in one or more embodiments of this application, refer to the following embodiments.

The terminal processor 304 may be configured to read and execute a computer-readable instruction. Specifically, the terminal processor 304 may be configured to invoke a program stored in the memory 312, for example, the implementation program, on the terminal 300 side, of the signal transmission method provided in one or more embodiments of this application, and execute an instruction included in the program.

The terminal processor 304 may be a modem processor, and is a module that implements main functions in wireless communications standards such as 3GPP and ETSI. The modem may be used as an independent chip, or may be combined with other chips or circuits to form system-level chips or integrated circuits. These chips or integrated circuits may be used in all devices that implement a wireless communication function, including mobile phones, computers, laptops, tablets, routers, wearable devices, automobiles, home appliances, and the like. It should be noted that, in different implementations, the terminal processor 304 may be used as an independent chip, and is coupled to an off-chip memory, that is, the chip includes no memory. Alternatively, the terminal processor 304 is coupled to an on-chip memory and integrated into a chip, that is, the chip includes the memory.

It may be understood that the terminal 300 may be the terminal 103 in the wireless communications system 100 shown in FIG. 1, and may be implemented as a mobile device, a mobile station, a mobile unit, a radio unit, a remote unit, a user agent, a mobile client, or the like.

It should be noted that the terminal 300 shown in FIG. 9 is merely an implementation of this application. In actual application, the terminal 300 may alternatively include more or fewer components. This is not limited herein.

Figure 10:
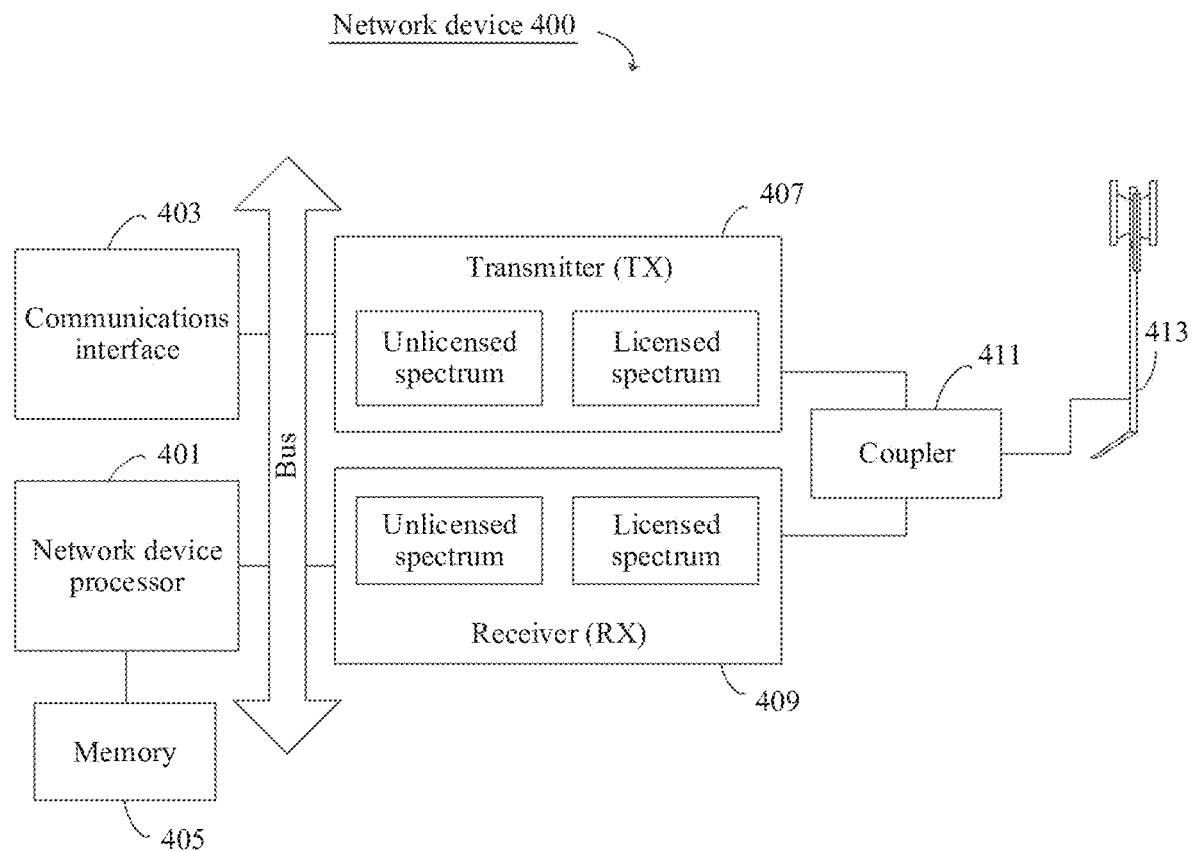
FIG. 10 is an example schematic diagram of a hardware architecture of a network device according to an embodiment of this application.

FIG. 10 shows a network device 400 according to some embodiments of this application. As shown in FIG. 10, the network device 400 may include a communications interface 403, one or more network device processors 401, a transmitter 407, a receiver 409, a coupler 411, an antenna 413, and a memory 405. These components may be connected through a bus 504 or in another manner. In FIG. 10, an example in which the components are connected through the bus is used.

The communications interface 403 may be used by the network device 400 to communicate with another communications device, for example, a terminal device or another base station. Specifically, the terminal device may be the terminal 300 shown in FIG. 9. The communications interface 403 is an interface between the network device processor 401 and a transceiver system (including the transmitter 407 and the receiver 409), for example, an S1 interface in LTE. In a specific implementation, the communications interface 403 may include one or more of a global system for mobile communications (GSM) (2G) communications interface, a wideband code division multiple access (WCDMA) (3G) communications interface, a long term evolution (LTE) (4G) communications interface, and the like, or may be a 4.5G, 5G, or future new radio communications interface. In addition to a wireless communications interface, a wired communications interface 403 may further be configured for the network device 400 to support wired communication. For example, a backhaul link between one network device 400 and another network device 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to divide a mobile communication signal into a plurality of signals, and allocate the plurality of signals to a plurality of receivers 409.

The transmitter 407 may be configured to perform transmission processing on a signal output by the network device processor 401, for example, modulate the signal in a licensed frequency band or an unlicensed frequency band.

The receiver 409 may be configured to perform receiving processing on a mobile communication signal received by the antenna 413. For example, the receiver 409 may demodulate a received signal that has been modulated in an unlicensed frequency band or a licensed frequency band.

In some embodiments of this application, the transmitter 407 and the receiver 409 may be considered as a wireless modem. In the network device 400, there may be one or more transmitters 407 and one or more receivers 409.

The memory 405 is coupled to the network device processor 401, and is configured to store various software programs and/or a plurality of sets of instructions. In a specific implementation, the memory 405 may include a high-speed random access memory, and may also include a nonvolatile memory, such as one or more disk storage devices, a flash memory device, or another nonvolatile solid-state storage device. The memory 405 may store an operating system (briefly referred to as a system below), for example, an embedded operating system such as uCOS, VxWorks, or RTLinux. The memory 405 may further store a network communications program. The network communications program may be used to communicate with one or more additional devices, terminal devices, and network devices.

The network device processor 401 may be configured to manage radio channels, establish or disconnect a call or communication link, and control cross-cell handover of user equipment in a local control cell. In a specific implementation, the network device processor 401 may include an administration module/communication module (AM/CM) (a center for speech channel switching and information exchange), a basic module (BM) (configured to implement call processing, signaling processing, radio resource management, radio link management, and circuit maintenance functions), a transcoder and sub-multiplexer (TCSM) (configured to implement multiplexing/demultiplexing and transcoding functions), and the like.

In this application, the network device processor 401 may be configured to read and execute a computer-readable instruction. Specifically, the network device processor 401 may be configured to invoke a program stored in the memory 405, for example, an implementation program, on a network device 400 side, of a signal transmission method provided in one or more embodiments of this application, and execute an instruction included in the program.

The network device processor 401 may be a modem processor, and is a module that implements main functions in wireless communications standards such as 3GPP and ETSI. The modem may be used as an independent chip, or may be combined with other chips or circuits to form system-level chips or integrated circuits. These chips or integrated circuits may be used in all network side devices that implement a wireless communication function. For example, in an LTE network, the network side device is referred to as an evolved NodeB (eNB or eNodeB). In a 3rd generation (3G) network, the network side device is referred to as a NodeB. In a 5G network, the network side device is referred to as a 5G NodeB (NR NodeB, gNB). It should be noted that, in different implementations, the network device processor 401 may be used as an independent chip, and is coupled to an off-chip memory, that is, the chip includes no memory. Alternatively, the network device processor 401 is coupled to an on-chip memory and integrated into a chip, that is, the chip includes the memory.

It may be understood that the network device 400 may be the network device 101 in the wireless communications system 100 shown in FIG. 1, and may be implemented as a base transceiver station, a wireless transceiver, a basic service set (BSS), an extended service set (ESS), a NodeB, an eNodeB, or the like. The network device 400 may be implemented as several different types of base stations, for example, a macro base station, a micro base station, and the like. The network device 400 may apply different wireless technologies, for example, a cell radio access technology or a WLAN radio access technology.

It should be noted that the network device 400 shown in FIG. 10 is merely an implementation of this application. In actual application, the network device 400 may alternatively include more or fewer components. This is not limited herein.

Figure 11:
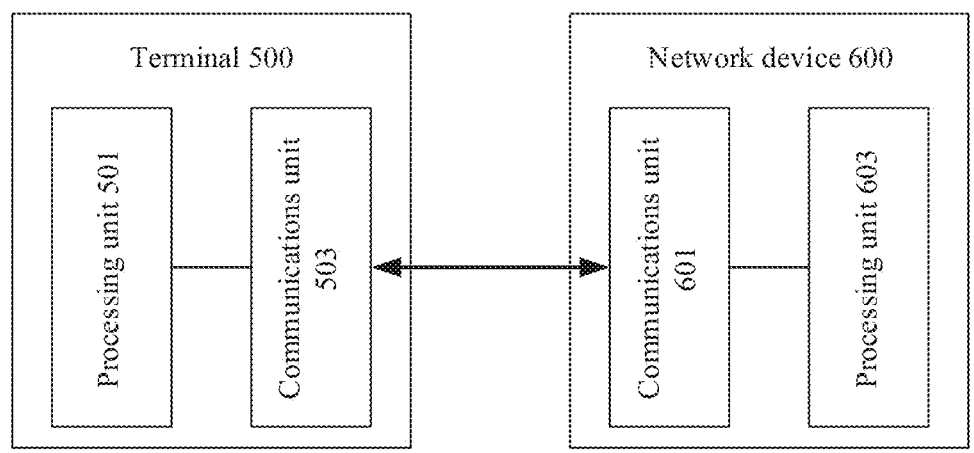
FIG. 11 is an example functional block diagram of a wireless communications system, a terminal, and a network device according to this application.

FIG. 11 shows a wireless communications system 10 according to an embodiment of this application, and a network device 600 and a terminal 500 in the wireless communications system 10. The network device 600 may be the network device in the foregoing embodiments, and the terminal 500 may be the terminal in the foregoing embodiments.

As shown in FIG. 11, the terminal 500 may include a processing unit 501 and a communications unit 503. The network device 600 may include a communications unit 601 and a processing unit 603.

The following describes specific implementations of the terminal 500 and the network device 600 in the foregoing solution 1.

In the foregoing solution 1, functions of the terminal 500 may be specifically implemented as follows:

The communications unit 503 may specifically include a sending unit 5031 and a receiving unit 5033.

The receiving unit 5033 may be configured to receive configuration information, where the configuration information may indicate N sets of power control parameters configured for M uplink resources or uplink resource sets, where M≥1, M is a positive integer, N>1, and N is a positive integer.

The sending unit 5031 may be configured to transmit an uplink signal on the M uplink resources or uplink resource sets, where transmission power for transmitting the uplink signal on the M uplink resources or uplink resource sets is determined based on a first power control parameter, and the first power control parameter is selected from the N sets of power control parameters.

Optionally, the processing unit 501 may be configured to: determine the first power control parameter from the N sets of power control parameters, and determine, based on the first power control parameter, the transmission power for transmitting the uplink signal on the M uplink resources or uplink resource sets.

In the foregoing solution 1, functions of the network device 600 may be specifically implemented as follows:

The communications unit 601 may specifically include a receiving unit 6011 and a sending unit 6013.

The sending unit 6013 may be configured to send configuration information to the terminal, where the configuration information may indicate N sets of power control parameters configured for M uplink resources or uplink resource sets.

The receiving unit 6011 may be configured to receive, on the M uplink resources or uplink resource sets, an uplink signal sent by the terminal.

The processing unit 603 may be configured to configure the N sets of power control parameters for the M uplink resources or uplink resource sets.

In this application, a relationship between the M uplink resources or uplink resource sets (uplink resources/resource sets) and the N sets of power control parameters may be reflected as follows:

Optionally, each of the M uplink resources/resource sets is associated with the N sets of power control parameters. Herein, that each of the M uplink resources/resource sets is associated with the N sets of power control parameters means that a power control parameter corresponding to each of the M uplink resources/resource sets may be selected from the N sets of power control parameters. In other words, the N sets of power control parameters are candidate power control parameters of each of the M uplink resources/resource sets.

Optionally, at least one of the M uplink resources/resource sets is associated with the N sets of power control parameters. Herein, that the at least one uplink resource/resource set is associated with the N sets of power control parameters means that a power control parameter corresponding to each of the at least one uplink resource/resource set may be selected from the N sets of power control parameters. In other words, the N sets of power control parameters are candidate power control parameters of the at least one uplink resource/resource set.

Optionally, at least one of the M uplink resources/resource sets is associated with at least one of the N sets of power control parameters. Herein, that the at least one uplink resource/resource set is associated with the at least two set of power control parameters means that a power control parameter corresponding to each of the at least one uplink resource/resource set may be selected from the at least two set of power control parameters. In other words, the at least two set of power control parameters is candidate power control parameters of the at least one uplink resource/resource set.

In some optional embodiments, the power control parameter may include one or more of the following: target reception power of the uplink signal, a path loss compensation factor, and a path loss reference signal. Optionally, for an SRS or a PUSCH, the power control parameter may include the target reception power of the uplink signal, the path loss compensation factor, and the path loss reference signal. Optionally, for a PUCCH, the power control parameter may include the path loss reference signal and the target reception power of the uplink signal.

In some optional embodiments, the configuration information may indicate a mapping between a panel and a power control parameter. In some optional embodiments, the configuration information may alternatively indicate only the N sets of power control parameters, a mapping between the N sets of power control parameters and panels may comply with a preset mapping rule, and the preset mapping rule is known to the terminal 500.

In some optional embodiments, the processing unit 603 in the network device may be specifically configured to: for different uplink signals, configure the N sets of power control parameters for the M uplink resources/resource sets. Details may be as follows:

1. The N sets of power control parameters are configured for one SRS resource set. In this case, M=1. Different from that in the prior art, one SRS resource set no longer corresponds to only one set of power control parameters, but corresponds to a plurality of sets of power control parameters. This constitutes no limitation. Alternatively, a plurality of SRS resource sets may be bound together, and the N sets of power control parameters are configured for the plurality of SRS resource sets. In this case, M>1.

2. The N sets of power control parameters are configured for one PUSCH resource. In this case, M=1. Different from that in the prior art, one PUSCH resource no longer corresponds to only one set of power control parameters, but corresponds to a plurality of sets of power control parameters. This constitutes no limitation. Alternatively, a plurality of PUSCH resources may be bound together, and the N sets of power control parameters are configured for the plurality of PUSCH resources. In this case, M>1.

3. The N sets of power control parameters are configured for one PUCCH resource set list or resource list. One PUCCH resource set list includes M (M≥1, and M is a positive integer) PUCCH resource sets, and one PUCCH resource list includes M (M≥1, and M is a positive integer) PUCCH resources. Different from that in the prior art, one PUCCH resource set list or resource list no longer corresponds to only one set of power control parameters, but corresponds to a plurality of sets of power control parameters.

In some optional embodiments, the N sets of power control parameters may include a power control parameter for transmitting an uplink signal on the M uplink resources or uplink resource sets through a single antenna panel and/or a power control parameter for transmitting an uplink signal on the M uplink resources or uplink resource sets through a plurality of antenna panels.

In some optional embodiments, the processing unit 603 in the network device 600 may configure the N sets of power control parameters in the following manners:

Manner 1: Configure a power control parameter for each panel (per panel configuration manner).

Specifically, K+Q sets of power control parameters are configured for the M uplink resources/resource sets, that is, N=K+Q. The K sets of power control parameters are respectively configured for the K panels to separately transmit uplink signals, and the Q sets of power control parameters are configured for a plurality of panels to transmit an uplink signal. Q≥1, and Q is a positive integer. The K panels are a plurality of panels of the terminal, K≤L, and L represents a quantity of panels of the terminal.

Manner 2: Configure a power control parameter based on a transmission mode.

Specifically, the N sets of power control parameters may be configured for the M uplink resources/resource sets based on the transmission mode. One transmission mode may correspond to one or more sets of power control parameters.

Optionally, a total of two sets of power control parameters may be configured for the M uplink resources/resource sets, that is, N=2. In the two sets of power control parameters, one set of power control parameters is configured for single-panel transmission of an uplink signal, and the other set of power control parameters is configured for multi-panel transmission of an uplink signal.

Manner 3: The manner 3 is similar to the manner 1, but no power control parameter is configured for multi-panel transmission of an uplink signal.

Specifically, K sets of power control parameters are configured for the M uplink resources/resource sets, that is, N=K. The K sets of power control parameters are respectively configured for the K panels to separately transmit uplink signals. Power control parameters used by at least two panels to transmit uplink signals include a power control parameter used by each of the at least two panels to transmit an uplink signal.

In some optional embodiments, the processing unit 501 in the terminal 500 may determine the first power control parameter in the following manners:

Manner 1: Determine the first power control parameter based on an implicit indication of the network device.

Specifically, the network device may send spatial relationship information of the M uplink resources/resource sets to the terminal. Correspondingly, the terminal may receive the spatial relationship information sent by the network device. A reference signal indicated by the spatial relationship information and the uplink signal carried in the M uplink resources/resource sets have a same spatial characteristic parameter. The reference signal indicated by the spatial relationship information is the source reference signal mentioned in the foregoing introduction content of the spatial relationship information, and may include an SRS, a CSI-RS, or the like.

Optionally, the processing unit in the terminal 500 may be specifically configured to determine the first power control parameter based on the spatial relationship information. Optionally, the processing unit in the terminal 500 may be specifically configured to determine the first power control parameter based on one or more of a panel used for the reference signal indicated by the spatial relationship information, a resource, a resource set, or a resource group to which the reference signal indicated by the spatial relationship information belongs, and a quantity of reference signals indicated by the spatial relationship information.

Manner 2: Determine the first power control parameter based on an explicit indication of the network device.

Specifically, the network device may send one or more of the following indication information to the terminal: antenna panel switch indication information, antenna panel identifier information (panel ID), or indication information of the uplink signal transmission mode. Correspondingly, the terminal may receive the indication information sent by the network device. The uplink signal transmission mode may include single-panel transmission of an uplink signal and multi-panel transmission of an uplink signal. The information directly indicates a panel or a quantity of panels that should be used by the terminal to transmit the uplink signal on the M uplink resources/resource sets. The terminal may determine, based on one or more items in the information, the first power control parameter that needs to be used to transmit the uplink signal. In other words, the terminal may determine, based on the explicit indication of the network device, which set or sets of power control parameters are to be used.

It may be understood that for specific implementations of the function units included in each of the terminal 500 and the network device 600, refer to the foregoing solution 1.

The following describes specific implementations of the terminal 500 and the network device 600 in the foregoing solution 2.

In the foregoing solution 2, functions of the terminal 500 may be specifically implemented as follows:

The processing unit 501 may be configured to: if H antenna panels of the terminal are used to transmit uplink signals on M uplink resources or uplink resource sets, and a sum of first transmission power that respectively corresponds to the H antenna panels and that is determined based on power control parameters respectively corresponding to the H antenna panels is greater than maximum transmission power of the terminal, determine second transmission power respectively corresponding to at least one of the H antenna panels.

The communications unit 503 may be configured to transmit an uplink signal on the M uplink resources or uplink resource sets through the at least one antenna panel based on the second transmission power respectively corresponding to the at least one antenna panel. A sum of the second transmission power respectively corresponding to the at least one antenna panel is less than or equal to the maximum transmission power of the terminal. H≥2, and H is a positive integer.

In the foregoing solution 2, functions of the network device 600 may be specifically implemented as follows:

The communications unit 601 may be configured to send configuration information to the terminal 500, where the configuration information may indicate power control parameters respectively corresponding to H antenna panels of the terminal 500.

The communications unit 601 may be further configured to receive, on the M uplink resources or uplink resource sets, an uplink signal sent by the terminal 500.

In the foregoing solution 2, no transmission power is allocated to some of the H panels, or no signal is transmitted through the some panels. In other words, a quantity of the at least one antenna panel is less than H.

In some optional embodiments, a plurality of sets of power control parameters, namely, the N sets of power control parameters configured in the foregoing solution 1, may be configured for the M uplink resources/resource sets. In this case, the power control parameters respectively corresponding to the H antenna panels are the N sets of power control parameters.

In a scenario in which the plurality of sets of power control parameters are configured for the M uplink resources/resource sets, the processing unit 501 may allocate, according to the following method, transmission power to an uplink signal corresponding to each panel:

(1) The first transmission power respectively corresponding to the H panels is first determined.

Specifically, referring to the foregoing solution 1, it can be learned that the processing unit 501 may be configured to determine, based on an implicit indication (that is, spatial relationship information) or an explicit indication (that is, panel switch indication information, a panel ID, or the like) of the network device 600, the power control parameters used by the terminal 500 to transmit the uplink signals through the H panels, namely, the first power control parameter mentioned in the foregoing solution 1. The processing unit 501 may be configured to determine, based on the first power control parameter, the first transmission power respectively corresponding to the H panels.

(2) Then, the second transmission power corresponding to the at least one of the H panels is determined.

The processing unit 501 may be configured to preferentially allocate, based on a path loss related to each panel, transmission power to an uplink signal corresponding to a panel with a lower path loss. In other words, power is allocated to a panel with a lower path loss in preference to a panel with a higher path loss.

Specifically, the processing unit 501 may be configured to perform at least one round of power allocation in ascending order of path losses related to the panels.

In an $i^{th}$ (i is a positive integer, and i is less than or equal to H) round of power allocation, a panel with a lowest current path loss is determined from panels for which no second transmission power is determined, and may be represented as $panel_{i-minPL}$. If current remaining to-be-allocated power $P_{i-r}$ is greater than or equal to first transmission power $P'_i$ corresponding to $panel_{i-minPL}$, actual transmission power allocated to $panel_{i-minPL}$ may be $min\{P'_i, Pmax\}$. If current remaining to-be-allocated power $P_{i-r}$ is less than first transmission power $P'_i$ corresponding to $panel_{i-minPL}$, actual transmission power allocated to $panel_{i-minPL}$ may be $min\{P'_i, P_{i-r}\}$ Herein, the actual transmission power of $panel_{i-minPL}$ is second transmission power corresponding to $panel_{i-minPL}$, Pmax represents the maximum transmission power of the terminal, and min represents selecting a minimum value. $P_{i-r}$ represents remaining transmission power obtained after transmission power allocated in previous i−1 rounds is subtracted from the maximum transmission power of the terminal.

Specifically, the $i^{th}$ round of power allocation may be expressed according to the following algorithm:

$$P_i = \min\{P_r, P'_i\}.$$

Herein, when i=1, Pr=Pmax, or when i>1, Pr= Pmax−$P_{i-1}$− . . . −$P_1$.

Herein, $P_i$ represents the second transmission power corresponding to panel$_{i\text{-}minPL}$, $P'_i$ represents the first transmission power corresponding to panel$_{i\text{-}minPL}$, Pmax represents the maximum transmission power of the terminal, Pr represents the remaining transmission power obtained after the transmission power allocated in the previous i−1 rounds of power allocation is subtracted from the maximum transmission power of the terminal, 0≤Pr≤Pmax, and panel$_{i\text{-}minPL}$ corresponds to an antenna panel that has a lowest path loss and for which no second transmission power is determined in the $i^{th}$ round of power allocation.

In some optional embodiments, only one set of power control parameters may be configured for the M uplink resources/resource sets. In this case, the power control parameters respectively corresponding to the H antenna panels are a same set of power control parameters.

In a scenario in which only one set of power control parameters is configured for the M uplink resources/resource sets, the processing unit 501 may be configured to determine, based on the only set of power control parameters, first transmission power corresponding to each of the H panels. However, it needs to be considered that path losses respectively corresponding to the panels are different. Specifically, the first transmission power corresponding to each of the H antenna panels may be determined based on the following parameters included in the set of power control parameters: target reception power p0 of the uplink signal, a path loss compensation factor alpha, and a path loss obtained through measurement based on a reference signal corresponding to each of the H panels in reference signals indicated by spatial relationship information.

In the scenario in which only one set of power control parameters is configured for the M uplink resources/resource sets, the processing unit 501 may be configured to preferentially allocate, based on a path loss related to each panel, transmission power to an uplink signal corresponding to a panel with a lower path loss. For a specific implementation, refer to the power allocation manner in the foregoing scenario in which the N sets of power control parameters are configured for the M uplink resources/resource sets.

It may be understood that for specific implementations of the function units included in each of the terminal 500 and the network device 600, refer to the foregoing solution 2.

In addition, an embodiment of the present technology further provides a wireless communications system. The wireless communications system may be the wireless communications system 100 shown in FIG. 1, or the wireless communications system 10 shown in FIG. 11, and may include a network device and a terminal. The terminal may be the terminal in the foregoing embodiments, and the network device may be the network device in the foregoing embodiments. Specifically, the terminal may be the terminal 300 shown in FIG. 9, and the network device may be the network device 400 shown in FIG. 10. Alternatively, the terminal may be the terminal 500 in the embodiment in FIG. 11, and the network device may be the network device 600 in the embodiment in FIG. 11. For specific implementations of the network and the terminal, refer to the foregoing embodiments.

The terminal 300 shown in FIG. 9 is used as an example. The terminal processor 304 is configured to invoke an instruction stored in the memory 312 to control the transmitter 306 to send a signal and control the receiver 308 to receive a signal. The transmitter 306 is configured to support the terminal in performing a process of transmitting data and/or signaling. The receiver 308 is configured to support the terminal in performing a process of receiving data and/or signaling. The memory 312 is configured to store program code and data of the terminal.

In this application, the receiver 308 may be configured to receive configuration information sent by the network device. The configuration information may indicate N sets of power control parameters configured for M uplink resources or uplink resource sets (uplink resources/resource sets), where M≥1, M is a positive integer, N>1, and N is a positive integer. For specific implementation of the components in the terminal, refer to the foregoing method embodiments. The terminal 300 may have L antenna panels, and the N sets of power control parameters are configured based on K antenna panels of the terminal 300, where M≥1, M is a positive integer, N>1, N is a positive integer, 2≤K≤L, and both K and L are positive integers.

In this application, the transmitter 306 may be configured to transmit an uplink signal. Transmission power of the uplink signal is determined based on a first power control parameter, and the first power control parameter is selected from the N sets of power control parameters.

For specific implementation of the components in the terminal, refer to the foregoing method embodiments.

The network device shown in FIG. 10 is used as an example. The network device processor 401 is configured to control the transmitter 407 to send a signal and control the receiver 409 to receive a signal. The transmitter 407 is configured to support the network device in performing a process of transmitting data and/or signaling. The receiver 409 is configured to support the network device in performing a process of receiving data and/or signaling. The memory 405 is configured to store program code and data of the network device.

In this application, the transmitter 407 may be mainly configured to send configuration information to the terminal, where the configuration information may indicate N sets of power control parameters configured for M uplink resources or uplink resource sets.

In this application, the receiver 409 may be configured to receive, on the M uplink resources or uplink resource sets, an uplink signal sent by the terminal.

For specific implementation of the components in the network device, refer to the foregoing method embodiments.

Figure 12:
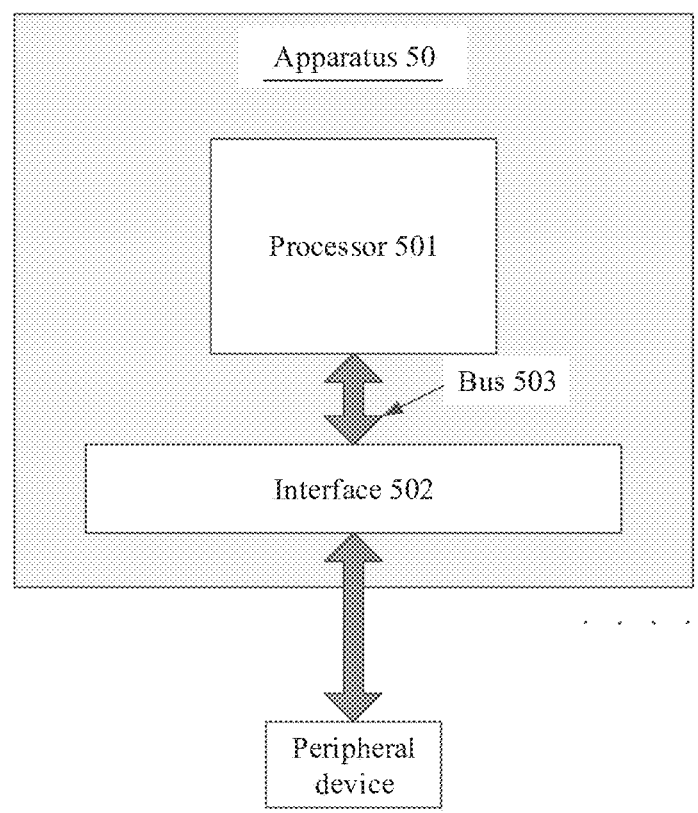
FIG. 12 is an example schematic structural diagram of a processor according to this application.

FIG. 12 is a schematic structural diagram of an apparatus according to this application. As shown in FIG. 12, the apparatus 50 may include a processor 501 and one or more interfaces 502 coupled to the processor 501.

The processor 501 may be configured to read and execute a computer-readable instruction. In specific implementation, the processor 501 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and address conversion. The register is mainly responsible for storing a quantity of register operations, intermediate operation results, and the like that are temporarily stored during instruction execution.

In specific implementation, a hardware architecture of the processor 501 may be an application-specific integrated circuit (ASIC) architecture, an MIPS architecture, an ARM architecture, an NP architecture, or the like. The processor 501 may be a single-core or multi-core processor.

The interface 502 may be configured to input to-be-processed data to the processor 501, and may output a processing result of the processor 501 to the outside. In specific implementation, the interface 502 may be a general-purpose input/output (GPIO) interface, and may be connected to a plurality of peripheral devices (such as a radio frequency module). The interface 502 may further include a plurality of independent interfaces, for example, an Ethernet interface and a mobile communications interface (for example, an X1 interface), which are separately responsible for communication between different peripheral devices and the processor 501.

In this application, the processor 501 may be configured to: invoke, from a memory, an implementation program, on a network device side or a terminal side, of a signal transmission method provided in one or more embodiments of this application, and execute an instruction included in the program. The interface 502 may be configured to output an execution result of the processor 501. In this application, the interface 502 may be configured to output a processing result of the processor 501. For the signal transmission method provided in one or more embodiments of this application, refer to the foregoing embodiments.

It should be noted that functions corresponding to the processor 501 and the interface 502 may be implemented by using a hardware design, or may be implemented by using a software design, or may be implemented by combining software and hardware. This is not limited herein.

Methods or algorithm steps described in combination with the content disclosed in the embodiments of the present technology may be implemented by hardware, or may be implemented by the processor by executing a software instruction. The software instruction may include a corresponding software module. The software module may be stored in a RAM, a flash memory, a ROM, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a transceiver or a relay device. Certainly, the processor and the storage medium may alternatively exist in a radio access network device or a terminal device as discrete components.

A person skilled in the art should be aware that in the foregoing one or more examples, functions described in the embodiments of the present technology may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium accessible to a general-purpose computer or a dedicated computer.

In the foregoing specific implementations, the objectives, technical solutions, and beneficial effects of the embodiments of the present technology are further described in detail. It should be understood that the foregoing descriptions are merely specific implementations of the embodiments of the present technology, but are not intended to limit the protection scope of the embodiments of the present technology. Any modification, equivalent replacement, or improvement made based on the technical solutions of the embodiments of the present technology shall fall within the protection scope of the embodiments of the present technology.

What is claimed is:

1. A signal transmission method, comprising:
receiving, by a terminal, configuration information, wherein the configuration information indicates N sets of power control parameters configured for M uplink resources or uplink resource sets, the terminal has L antenna panels, and the N sets of power control parameters are determined based on K antenna panels of the terminal, wherein $M \geq 1$, M is a positive integer, $N > 1$, and N is a positive integer, $2 \leq K \leq L$, and both K and L are positive integers; and
transmitting, by the terminal, an uplink signal on the M uplink resources or uplink resource sets, wherein transmission power for transmitting the uplink signal on the M uplink resources or uplink resource sets is determined based on a first power control parameter, and the first power control parameter is selected from the N sets of power control parameters.

2. The method according to claim 1, wherein
the N sets of power control parameters comprise a power control parameter for transmitting an uplink signal on the M uplink resources or uplink resource sets through a single antenna panel and/or a power control parameter for transmitting an uplink signal on the M uplink resources or uplink resource sets through a plurality of antenna panels.

3. The method according to claim 2, wherein the N sets of power control parameters comprise K+Q sets of power control parameters, the K sets of power control parameters are respectively configured for the K antenna panels to separately transmit uplink signals, and the Q sets of power control parameters are configured for a plurality of antenna panels to transmit an uplink signal, wherein $Q \geq 1$, and Q is a positive integer.

4. The method according to claim 2, wherein the N sets of power control parameters comprise K sets of power control parameters, the K sets of power control parameters respectively correspond to the K antenna panels, and the terminal device transmits an uplink signal on each antenna panel based on a power control parameter corresponding to each antenna panel.

5. The method according to claim 1, wherein
the N sets of power control parameters are determined based on an uplink signal transmission mode,
a first transmission mode corresponds to one or more sets of power control parameters, and
the first transmission mode comprises at least one of: single-antenna panel transmission, multi-antenna panel transmission, single-TRP transmission, and coordinated multipoint transmission/reception.

6. The method according to claim 1, further comprising:
receiving, by the terminal, first indication information sent by the network device, wherein
the first power control parameter is determined based on the first indication information, and the first indication information indicates spatial relationship information of the uplink signal carried in the M uplink resources or uplink resource sets.

7. The method according to claim 6, wherein the first power control parameter is determined based on at least one of: an antenna panel used for a reference signal indicated by the first indication information, a resource or resource set to which the reference signal indicated by the first indication information belongs, a resource group to which the reference signal indicated by the first indication information belongs, and a quantity of reference signals indicated by the first indication information.

8. The method according to claim 6, wherein the reference signal indicated by the first indication information comprises a reference signal indicated by a higher-layer parameter that describes spatial relationship information and/or a reference signal associated with an uplink resource used for non-codebook transmission.

9. The method according to claim 1, further comprising:
receiving, by the terminal, second indication information sent by the network device, wherein
the first power control parameter is determined based on the second indication information, and the second indication information comprises at least one of: antenna panel switch indication information, antenna panel identifier information, or indication information of the uplink signal transmission mode.

10. The method according to claim 1, wherein the power control parameter comprises at least one of: target reception power of the uplink signal, a path loss compensation factor, and reference signal information used for path loss estimation.

11. A signal transmission method, comprising:
sending, by a network device, configuration information to a terminal, wherein the configuration information indicates N sets of power control parameters configured for M uplink resources or uplink resource sets, the terminal has L antenna panels, and the N sets of power control parameters are configured based on K antenna panels of the terminal, wherein M≥1, M is a positive integer, N>1, N is a positive integer, 2≤K≤L, and both K and L are positive integers; and
receiving, by the network device on the M uplink resources or uplink resource sets, an uplink signal sent by the terminal.

12. The method according to claim 11, further comprising: sending, by the network device, first indication information to the terminal, wherein the first indication information indicates spatial relationship information of the uplink signal carried in the M uplink resources or uplink resource sets.

13. The method according to claim 11, further comprising: sending, by the network device, second indication information to the terminal, wherein the second indication information comprises at least one of: antenna panel switch indication information, antenna panel identifier information, or indication information of an uplink signal transmission mode.

14. A terminal, comprising:
a transmitter;
a receiver;
a memory; and
a processor operatively coupled to the memory, wherein
the receiver is configured to receive configuration information, wherein the configuration information indicates N sets of power control parameters configured for M uplink resources or uplink resource sets, the terminal has L antenna panels, and the N sets of power control parameters are determined based on K antenna panels of the terminal, wherein M≥1, M is a positive integer, N>1, and N is a positive integer, 2≤K≤L, and both K and L are positive integers; and
the transmitter is configured to transmit an uplink signal on the M uplink resources or uplink resource sets, wherein transmission power for transmitting the uplink signal on the M uplink resources or uplink resource sets is determined based on a first power control parameter, and the first power control parameter is selected from the N sets of power control parameters.

15. The terminal according to claim 14, wherein the receiver is further configured to receive first indication information sent by the network device; and
the first power control parameter is determined based on the first indication information, and the first indication information indicates spatial relationship information of the uplink signal carried in the M uplink resources or uplink resource sets.

16. The terminal according to claim 14, wherein the receiver is further configured to receive second indication information sent by the network device; and
the first power control parameter is determined based on the second indication information, and the second indication information comprises at least one of: antenna panel switch indication information, antenna panel identifier information, or indication information of an uplink signal transmission mode.

17. A communications system, comprising a network device and the terminal according to claim 14.

18. A network device, comprising:
a transmitter;
a receiver;
a memory; and
a processor operatively coupled to the memory, wherein
the transmitter is configured to send configuration information to a terminal, wherein the configuration information indicates N sets of power control parameters configured for M uplink resources or uplink resource sets, the terminal has L antenna panels, and the N sets of power control parameters are configured based on K antenna panels of the terminal, wherein M≥1, M is a positive integer, N>1, N is a positive integer, 2≤K≤L, and both K and L are positive integers; and
the receiver is configured to receive, on the M uplink resources or uplink resource sets, an uplink signal sent by the terminal.

19. The network device according to claim 18, wherein the transmitter is further configured to send first indication information to the terminal, wherein the first indication information indicates spatial relationship information of the uplink signal carried in the M uplink resources or uplink resource sets.

20. The network device according to claim 18, wherein the transmitter is further configured to send second indication information to the terminal, wherein the second indication information comprises at least one of: antenna panel switch indication information, antenna panel identifier information, or indication information of an uplink signal transmission mode.

* * * * *